(12) United States Patent
Kalevo et al.

(10) Patent No.: US 10,255,315 B2
(45) Date of Patent: Apr. 9, 2019

(54) ENCODER, DECODER AND METHOD

(71) Applicant: Gurulogic Microsystems OY, Turku (FI)

(72) Inventors: Ossi Kalevo, Toijala (FI); Tuomas Karkkainen, Turku (FI)

(73) Assignee: Gurulogic Microsystems Oy (FI)

( * ) Notice: Subject to any disclaimer, the term of this patent is extended or adjusted under 35 U.S.C. 154(b) by 20 days.

(21) Appl. No.: 14/100,701

(22) Filed: Dec. 9, 2013

(65) Prior Publication Data

US 2014/0164419 A1 Jun. 12, 2014

Related U.S. Application Data

(63) Continuation-in-part of application No. 13/715,405, filed on Dec. 14, 2012.

(30) Foreign Application Priority Data

Dec. 11, 2012 (GB) .................................. 1222240.2
Nov. 8, 2013 (EP) ..................................... 13005263

(51) Int. Cl.
*G06F 17/30* (2006.01)
*H04N 19/46* (2014.01)
*H04N 19/94* (2014.01)

(52) U.S. Cl.
CPC ....... *G06F 17/30386* (2013.01); *H04N 19/46* (2014.11); *H04N 19/94* (2014.11)

(58) Field of Classification Search
CPC ... G06F 17/30386; H04N 19/46; H04N 19/94
(Continued)

(56) References Cited

U.S. PATENT DOCUMENTS 4,013,828 A 3/1977 Judice
4,553,171 A 11/1985 Holladay et al.
(Continued)

FOREIGN PATENT DOCUMENTS

CN 102138328 A 7/2011
EP 0245027 A2 11/1987
(Continued)

OTHER PUBLICATIONS

Office Action dated Dec. 4, 2014 corresponding to Japanese Patent Application No. 2013-248857, 5 pages.
(Continued)

*Primary Examiner* — On S Mung
(74) *Attorney, Agent, or Firm* — Eric L. Sophir; Dentons US LLP

(57) ABSTRACT

A method of encoding source data to generate corresponding encoded data for transmission or storage includes matching one or more portions of the source data to one or more elements in one or more databases, wherein the one or more elements are representative of corresponding one or more data blocks, and recording reference values which relate the one or more portions of the source data to the one or more matched elements; and including the reference values in the encoded data together with the one or more databases and/or information identifying the one or more databases. The methods are implemented in an encoder, a decoder and in a codec. In the codec, the at least one encoder and the at least one decoder share one or more databases referred to by reference values included in the encoded data.

31 Claims, 3 Drawing Sheets

(58) Field of Classification Search
USPC .................................... 375/240.24, 240.25
See application file for complete search history.

(56) References Cited

U.S. PATENT DOCUMENTS

| | | | |
|---|---|---|---|
| 5,802,315 | A | 9/1998 | Uchiumi et al. |
| 5,838,963 | A | 11/1998 | Griffiths |
| 8,874,531 | B2 | 10/2014 | Sulieman et al. |
| 2007/0188296 | A1* | 8/2007 | Brune ............... G05B 19/0423 340/3.7 |
| 2008/0071724 | A1* | 3/2008 | Parkinson ......... G06F 17/30569 |
| 2009/0110079 | A1* | 4/2009 | Haga ................... H04N 19/593 375/240.24 |
| 2009/0285496 | A1 | 11/2009 | Collins |
| 2010/0322301 | A1 | 12/2010 | Kärkkäinen |
| 2012/0020581 | A1 | 1/2012 | Zarom |

FOREIGN PATENT DOCUMENTS

| | | |
|---|---|---|
| EP | 1787262 A1 | 5/2007 |
| GB | 2362055 A | 11/2001 |
| JP | 04-265020 | 9/1992 |
| JP | 04-265020 A | 9/1992 |
| JP | 9154131 A | 6/1997 |
| JP | 2009111649 A | 5/2009 |
| JP | 2012523765 A | 10/2012 |
| KR | 10-2012-0003909 A | 1/2012 |
| RU | 2 388 172 C2 | 4/2010 |
| TW | I229559 B | 3/2005 |
| WO | 96/08928 A1 | 3/1996 |
| WO | 2006/016007 A1 | 2/2006 |
| WO | 20101118254 A1 | 10/2010 |
| WO | 2010/146239 A1 | 12/2010 |

OTHER PUBLICATIONS

English Translation of Office Action dated Dec. 4, 2014 corresponding to Japanese Patent Application No. 2013-248857, 6 pages.
Office Action dated Apr. 16, 2015 corresponding to Japanese Patent Application No. 2013-248857, 7 pages.
Office Action dated Sep. 9, 2015 corresponding to Taiwan Patent Application No. 10421208940, 10 pages.
Extended European Search Report dated Mar. 5, 2013 corresponding to European Patent Application No. 13005263.2-1908, 9 pages.
Panchanathan, S., et al., "Adaptive algorithms for image coding using vector quantization," Signal Processing, Image Communication, Elsevier Science Publishers, Amsterdam, NL, vol. 4, No. 1, Nov. 1, 1991, pp. 81-92.
Office Action dated Dec. 30, 2015 corresponding to U.S. Appl. No. 13/715,405, 15 pages.
Office Action dated Aug. 12, 2015 corresponding to European Patent Application No. 13005263.2, 10 pages.
English Translation of Korean Office Action dated Sep. 19, 2016 issued in Korean Application No. 10-2013-0153317, 13 pages.
Japanese Notice of Allowance dated Oct. 3, 2016 in Japanese Patent Application No. 2013-248857, with English translation of allowed claims, 7 pages.
Chinese Office Action dated Jul. 6, 2016, with English translation, in Chinese Patent Application No. 2013106709638, 9 pages.
S. Panchanahan et al., Adaptive Algorithms for Image Coding Using Vector Quantization, Signal Processing: Image Communication 4 (1991), pp. 81-92.
Russian Office Action with English Translation dated Oct. 19, 2016 in Russian Patent Application No. 2013153468/08, 7 pages.
English Translation of Russian Office Action dated Jan. 15, 2016 in Russian Patent Application No. 2013153468/08, 4 pages.
Notice of Panel Decision from Pre-Appeal Brief Review, Notification Date Feb. 10, 2017, in U.S. Appl. No. 13/715,405, 2 pages.
Russian Decision to Grant a Patent for an Invention dated Jan. 16, 2017 (with English Translation) in Russian Application No. 2013153468/08(083535), 16 pages.
European Summons to Attend Oral Proceedings, dated Nov. 30, 2016 in European Application No. 13005263.2, 11 pages.
Indian Examination Report, dated Jun. 21, 2018, issued in corresponding Indian Application No. 3703/MUM/2013, 7 pages.

* cited by examiner

ENCODER, DECODER AND METHOD

CROSS REFERENCE TO RELATED APPLICATIONS

This application is a continuation-in-part of U.S. patent application Ser. No. 13/715,405, filed Dec. 14, 2012, entitled "ENCODER, DECODER, AND METHOD," the entire content of which is incorporated in its entirety.

This application also claims priority under 35 U.S.C. § 119(a) and 37 CFR 1.55 to European Patent Application No. 13005263.2, filed on Nov. 8, 2013, and to U.K. Patent Application No. 1222240.2, filed on Dec. 11, 2012, the entire contents of which are hereby incorporated by reference in their entirety.

TECHNICAL FIELD

The present disclosure relates to encoders for encoding source data, for example captured image data and/or audio data, for generating corresponding encoded data; moreover, the present disclosure relates to decoders for decoding the encoded data to generate corresponding decoded data, for example decoded data representative of the source data; the encoders and the decoders are operable, for example, to employ one or more databases which include information which is processed in combination with the encoded data at the decoders for generating the decoded data; the one or more databases are, for example, located at one or more data servers. Additionally, the present disclosure concerns methods of encoding source data to generate corresponding encoded data; yet additionally, the present disclosure concerns methods of decoding the encoded data for generating corresponding decoded data, for example representative of the source data; the methods, for example, include utilizing one or more databases which include information which is processed in combination with the encoded data to generate the decoded data. Furthermore, the present disclosure relates to software products recorded on non-transitory namely non-transient, machine-readable data storage media, wherein the software products are executable upon computing hardware for implementing aforementioned methods.

BACKGROUND

Conventionally, encoding source data, for example via contemporary MPEG encoding of captured image data, involves processing the source data to transform the source data into encoded data by applying one or more transforms to the source data. Moreover, decoding the encoded data involves processing the encoded data to transform the encoded data to corresponding decoded data, for example decoded data representative of the source data, by applying one or more inverse transforms to the encoded data. Such encoding can be employed for compressing the source data, for example for reducing its data size for transmission or storage on a data carrier; alternatively, or additionally, such encoding can be employed to increase security of the source data when being transmitted through a transmission medium, for example via the Internet. It is conventional practice to implement such encoders and decoders as self-contained processing units, for example embedded in digital cameras, DVD players and similar consumer products. However, with greater contemporary interconnectivity of data processing devices, it has become a more recent practice to design encoders and decoders to be implemented using software products so that they can be reconfigured, for example for adapting the decoders to cope with encoded data which has been encoded using encoding transforms which have been recently evolved and upgraded.

In a published U.S. Pat. No. 4,553,171, there is described a method of digitally printing a digital image by reference to a succession of code words representing blocks of pixels of an original image. The original image is encoded by subdividing it into uniform size blocks of pixels. Optionally, each of the blocks of pixels is given a unique identifier unless it is identical to any of the previously scanned blocks. Identical blocks of pixels are given the same identifier. When printing the original image as represented by aforesaid blocks of pixels as represented by identifiers expressed as code words, the identifiers are scanned in sequence and the corresponding pixel blocks are successively stored in buffer memories to modulate the printer which generates a printout of the original image. Thus, the original image is printed from data including identifiers comprising block index numbers that refer to a form of database storing representations of the pixel blocks.

In a U.S. Pat. No. 4,013,828, there is described a method of processing an image, wherein the image is scanned and dither-processed in picture element groups of predetermined size. Each picture element group corresponds to a corresponding group of cells of a remotely-located display panel. As each picture element group is scanned, a pattern represented by corresponding dithered image bits to the picture element group is compared to a dictionary of patterns stored in a first memory. If the pattern is not among those stored in the first memory, it is assigned an associated code word and is entered into the memory. Moreover, both the pattern and its code word are transmitted to the remotely-located display panel where they are stored in a second memory; the second memory is then accessed and individual cells of a cell group corresponding to the scanned picture are energized in accordance with the pattern stored in the second memory. If a scanned pattern is the same as one already stored in the first memory, only that code word associated with that pattern is transmitted to the remote location for achieving a reduction in data flow between the first memory and the second memory, namely by reusing data which has already been transferred to the second memory. However, the method does not directly compress the data flow in a conventional sense.

In a published United Kingdom patent GB 2362055, there is described a method of coding an image, wherein the method includes:

(a) dividing the image into image blocks;
(b) encoding the image blocks is such a way that the image blocks are compared with already existing blocks in a database, and choosing an existing block from the database which is a good enough match to a corresponding one amongst the image blocks; and
(c) coding the image blocks with reference to codes representative of the already existing blocks.

The method employs a code library, namely a database. However, on account of data in association with the database elements not having any connection with each other, performing searches in the database to find matches is difficult and requires considerable computing resources as the size of the database is increased. Conversely, when the database is small, matching of the image blocks to the already existing blocks in the database is compromised, with a result that an image cannot be constructed from coded data generated by the method to a sufficient degree of quality. However, the method includes creating new elements if sufficiently good matches are not found, wherein the new element is transmitted together with a reference value which identified it.

The usage of digital data, for example video, image, graphics and audio, is rapidly increasing as every year passes. On account of such usage, the amount of data being stored and transmitted has also increased rapidly as a function of progressing time. Moreover, such increase in data being stored and transmitted requires increasingly more resources for hardware devices, for example more electrical power consumed for providing more processing capacity and larger communication transmission bandwidths. An image generator as described in a published United States patent application US 20101322301 (Applicant: Gurulogic Microsystems Oy) defines a technical solution which addresses how to save bytes and generate varying images by using a database. However, there is a need for an encoder, and a corresponding decoder, based upon the use of an advanced database, which is operable to deliver many different types of databases in a more efficient manner, for use with all kinds of digital data, for example images, video, graphics and audio content.

SUMMARY

The embodiments described herein seek to provide an improved method of encoding source data, for example captured image data, audio data and similar, to generate corresponding encoded output data, and also an encoder operable to implement the method of encoding source data.

Moreover, the embodiments described herein seek to provide an improved method of decoding encoded data to generate corresponding decoded output data.

According to a first aspect, there is provided a method as claimed in appended claim 1; there is provided a method of encoding source data to generate corresponding encoded data for transmission or storage, wherein the source data includes at least one of: audio data, image data, video data, graphics data, multi-dimensional data, measurement data, characterized in that the method includes:
(a) matching one or more portions of the source data to one or more elements (E) in one or more databases, wherein the one or more elements (E) are representative of corresponding one or more data blocks, and recording reference values (R) which relate the one or more portions of the source data to the one or more matched elements (E); and
(b) including the reference values (R) in the encoded data together with the one or more databases and/or information identifying the one or more databases, wherein the method further includes:
(c) dividing the source data into areas having a unique area identifier (U);
(d) taking area-specific samples from the areas and computing corresponding reference values (R) on a basis of the samples; and
(e) checking whether the reference values (R) obtained from computations applied to source data have already been stored in the one or more databases or transmitted, and storing and/or transmitting the reference values (R), or the reference values (R) in a compressed state, for uniquely identifying elements (E) into the encoded data or storing and/or transmitting the encoded and/or original source data into the encoded data and optionally storing as a new element (E) into the one or more databases in an event that the reference values (R) have not previously been stored into the one or more databases.

The embodiments provide for a codec which is capable of achieving superior decoded video, image, graphics and audio content quality, whilst using fewer data bits to be communicated in comparison to known contemporary codecs.

In (c), the unique area identifier (U) describes a size, a shape and a location of the data block uniquely. The size is optionally a fixed size, for example 32 data values, 8×8 data values, or the size optionally depends on a type of content of the data, for example data block by data block. Area identifiers (U) or the information of the area identifiers (U) is optionally delivered, or are optionally pre-set.

Regarding sampling referred to in (d), it is optionally possible to use all the samples of the data when computing the reference value (R) or only part of them. Moreover, it is optionally possible to use only part of the samples, thereby resulting in faster performance and greater accuracy at corresponding area of the selected samples. It is also optionally possible to use weighting of the samples when computing the reference value (R) to provide one or more desired benefits compared to weight that is equal. A method of sampling employed can be selected based on needs in a given individual case, for example to improve the robustness or to enhance the characteristics of the data.

Reference values (R) are optionally construed as follows:
(i) it is feasible to compute several data values for the block/packet; one of them could be, for example, a reference value computed of the data values of the whole block/packet and in addition one or more reference values computed of the data values of the sub-blocks/packets;
(ii) the reference value of the element can consist of multiple parts such as amplitude, standard deviation, mean, min, max, hash, index, and so forth; and
(iii) reference values can be computed with different accuracy, for example as a function of spatial detail present in data to be encoded.

Optionally, the method includes employing one or more zero-mean databases for implementing the one or more databases. Zero-mean databases employ one or more translated or transformed data values wherein the one or more translated or transformed data values employ less data memory capacity in comparison to their corresponding data values prior to being translated or transformed. For example, a zero-mean database is generated by computing an average of all data values in a given database element in a database, and then subtracting the average from the data values so that the translated or transformed data values vary relative to a zero value. Such one or more zero-mean databases are potentially smaller in size and are more efficiently compressed when there arises a need to communicate them via a communication network. Optionally, a database element of a zero-mean database is very rarely a zero-average. However, it is still a database element wherein, by either incrementing it by one or by decrementing it by one, it is feasible to obtain a new mean which is further from zero than the mean of that database element, or at least as far from zero as the mean of that database element. The reason for this is as follows: the mean of a given original data block is often not an integer but instead a real number, namely a floating point number, and therefore, when the integer part is subtracted from the mean, namely from all data values from the element, then the fractional part will be either in the range (−0.5 . . . 0.5] or in the range [−0.5 . . . 0.5).

The purpose of zero-mean is to preserve space, namely memory usage, in the one or more databases, but not in data transfer. In practice, the data size for an individual block increases when zero-mean is used, because instead of the original dynamic range, one extra bit is needed to express the zero-mean values, since the sign bit is then necessary for each element value. The need for actual sign bit usage can be removed from the database storage by using a preset pedestal value with the zero mean database element. The dynamic range of the database element values can also be decreased by quantization, which will lose some information. Moreover, look-up-tables can be used for dynamic compression, but such an approach also results in information being lost. However, with the zero-mean elements, no new elements need to be inserted into the database when the mean changes, but instead the same element can be reused, and thus one element is suitable for all means in the dynamic range in question. If the database itself is transmitted, then only one element needs to be transmitted instead of, for example, 256 elements (with 8-bit dynamic); that is, the variation of the mean of the reference does not insert new elements into the database, but instead the mean is used together with the element in the database to construct the final data block.

Optionally, the one or more databases are located at one or more servers, for example one or more servers belonging to a third party, for example to one or more service providers. More optionally, use of the one or more database is subject to a fee being paid, for example a subscription fee and/or a per-use fee for accessing the one or more databases.

Optionally, when implementing the method, the one or more databases include one or more static databases and/or one or more dynamic databases.

A reference value (R) consists of values which have been calculated on a basis of data samples, but it can contain other parts as well. Furthermore, the reference value is actually an inexact concept. In other words, reference values are calculated for purposes of fast searching, and therefore, there can be many of them and their precision can also be very large or, alternatively, small.

However, as regards a transmitted reference value (R), this refers to a value which individually identifies a block in question between the encoder and the decoder, and it is on the basis of this transmitted reference value (R) that the elements are stored in the database. For a static database, the transmitted reference value (R) typically contains a few quantized, or more accurate, reference values (R) which were used in the search, and often also some value that refers to an ordinal number. For a dynamic database, the transmitted reference value (R) is usually only a value that describes the order of construction of this element, and its probability of occurrence.

A static database is usually not modified, and thus the transmitted reference value (R) is always the same for each element (E), both at the encoder and at the decoder. On the other hand, a dynamic database can be altered continuously; as some element (E) becomes more probable, its reference value (R) optionally decreases continuously so that it can be compressed more efficiently. However, it will be appreciated that even a dynamic transmitted reference value (R) optionally contains parts that have to do with the samples of the block, but they are not mandatory.

However, as regards searching for a dynamic element (E), this can also optionally be further speeded up by having corresponding reference values (R) that have been constructed from the samples of the block stored with good precision, for each element (E). The search in a dynamic database is further optionally accelerated by storing the elements (E) in some sort of order of probability, and therefore, an element (E) that occurs often is found faster. It is also to be noted that, because the transmitted reference value (R) of a static database contains the abovementioned part that refers to an ordinal number, this part, especially if it is several bits long, is also optionally utilized dynamically if so desired, just as the abovementioned transmitted reference value (R) of a dynamic database.

However, this kind of dynamics in a given static database is often not a desired feature, because in such a case, the entire data stream would have to be encoded from its beginning to the utilized bit position until it could be ensured which element is referred to in any given case. Therefore, one very major advantage of a static database, namely that it is unambiguous and explicit, would be lost. A slightly better compression ratio is potentially achieved, but simultaneously, associated free hopping when decoding the data, which was gained by the dynamic part of the reference value (R), would be lost.

In view of this, using a dynamic database is optionally time-limited, in which case those abovementioned jumps in data can be executed in such a way that the decoding is resumed at the resetting point of the dynamic database. A second major advantage of a static database is that it is always known prior to coding being initiated, and therefore its elements (E) often do not need to be transmitted to the decoder, nor to the encoder. In other words there are reference values (R), quantized reference values (R), ordinal numbers and transmitted reference values (R) (namely indexes), which consist of combinations of the former, and which refer to one unique element (E) in the database.

Thus, when a search is conducted at the encoder, more and more precise reference values (R) can be utilized than are transmitted from the encoder to a file or to the decoder. It may also be beneficial for the encoder to store for each database a selection of reference values (R) that is as large and as precise as possible, so as to ensure that the search will be fast and precise, namely only few check-ups are needed, but still rarely missing a best element (E).

Optionally, the method utilizes at least one of:
(a) the one or more static databases are generated by selecting elements from one or more dynamic databases;
(b) information present in the one or more portions of the source data is processed to generate one or more elements (E) for inclusion in the one or more dynamic databases; and
(c) selecting elements (E) from one or more earlier databases and including them in the one or more dynamic databases for use with the encoded data.

Moreover, the embodiments described herein may provide benefits of decreased data size in data storage, for example in data memory, data carrier and similar, which saves computational resources, electrical power consumption and data loading time.

More optionally, in the method, Internet Service Providers (ISP's) around the world are capable of providing faster static database servers in client Local Area Networks (LAN's), thereby enabling more efficient data transfer to be achieved, because, in operation, only a relatively small amount of new data blocks are sent, and existing database reference data blocks are received from a static database server in a given LAN. Optionally, the method is implemented in an encoder which is coupled via a communication network to the one or more databases. More optionally, at least one of the one or more databases is in a mutually similar local area network (LAN) of the communication network to that of the encoder. Optionally, the one or more databases are hosted in one or more data servers. For example, the database server is optionally implemented in a manner which is spatially adjacent to a codec implementing the method, for example on a memory spatially adjacent thereto.

Optionally, in the method, the reference values (R) include multiple parts which are separately encoded for inclusion in the encoded data. More optionally, in the method, one or more of the multiple parts are combined before being encoded for inclusion in the encoded data. Optionally, the multiple parts relate to variance V, mean M and amplitude A characteristics of one or more data blocks accessed via use of the reference value (R).

Optionally, a standard deviation can be used instead of variance V, and more optionally minimum, maximum, mode and median are used as new reference values (R). As regards minimum, maximum and amplitude, only two are optionally needed; the third one can be calculated on a basis of the other two. Moreover, various different hash values and CRC values are also valid reference values (R) when a perfect hit is searched for, or when there is a wish to distinguish the blocks having otherwise similar reference values (R) in the combination of blocks from one another in other ways than by using an ordinal number. Such an approach can be beneficial in that hash and CRC values can be calculated from data of a given data block, and they are therefore not dependent on order of transmission.

Optionally, all values can be utilized in the search, and with full precision, but when reference values (R) are transmitted or elements (E) are stored to the database, certain reference values are selected (0-n items) with a certain precision, and optionally also sections or parts that have to do with an ordinal number, which all identify the stored database elements and their data values explicitly and unambiguously.

The precision and the amount of parameters of a transmitted reference value (R) can also depend upon a quality parameter (Q). For example, a reference value (R) transmitted from a static database with good quality will contain an 8-bit mean value, an 8-bit standard deviation value, a 6-bit amplitude value, a 6-bit minimum value and an 8-bit ordinal number, whereas for a reference value (R) transmitted from a static database with inferior quality, a 7-bit mean value, a 7-bit standard deviation value, a 5-bit amplitude value and a 4-bit ordinal number will optionally suffice.

As regards a dynamic database, a reference value (R) transmitted from a dynamic database with good quality optionally includes an ordinal number expressed with, for example, 16 bits, and with inferior quality, for example 10 bits would suffice. The stored reference values (R) and the reference values (R) used in the search are, for example, optionally expressed with 16 bits for their mean and for standard deviation, and in concert with information describing dynamics of the data, for example 8 bits for amplitude, minimum, maximum, mode and median. Moreover, it will also be appreciated that all reference values (R) that are dependent on the data are optionally calculated from the samples of the decoded data block, for example both at the encoder and at the decoder, and therefore, both the encoder and the decoder are always able to calculate them with the same precision and with the desired precision for themselves.

The encoder needs full precision for the fast search, and furthermore, the encoder and the decoder need to have even those values already calculated, at least with the precision necessary for the transmission, so that the database elements (E) can be stored at the right database address for later use, as indicated by the transmitted reference value (R). It will also be appreciated that the quantization and compression of a reference value (R) are different things, although both will decrease the amount of encoded data. However, compression is recoverable, whereas quantization loses information in a desired fashion, in order to make the value easier to use, for example diminishes a size of a database and an amount of data to be transmitted, explicitly.

Optionally, in the method, the reference values (R) include information for guiding searching of corresponding one or more elements (E) in the one or more databases.

Optionally, in the method, the one or more elements (E) include one or more parameters from which one or more corresponding data blocks can be computed by interpolation. In addition to, or alternative to, interpolation, other computations such as decimation, extrapolation and cropping are optionally employed. These would pertain to all such database elements (E) which can be used by scaling upwards or downwards, or by enlarging the values to larger blocks, or by using only a smaller section of the element. Extrapolation and cropping of course demand also a bit of information indicative of where the extrapolation will take place, and at which part of the block cropping is to be executed, but interpolation and decimation can function automatically according to a relationship between the size of the block to be decoded and the size of the block of the database element (E). Optionally, the methods for interpolation and decimation can be stored and/or transmitted to the encoded data or they could be pre-selected.

Optionally, in the method, the one or more dynamic databases are created for a limited time duration, after which they are erased.

Optionally, the method includes restructuring one or more of the databases as a function of a frequency of accessing elements (E) within the databases for rendering more frequently accessed elements (E) faster to access using the reference values (R).

Optionally, in the method, elements (E) of the one or more dynamic databases are generated when matches of the one or more portions of the source data with one or more elements (E) in the one or more static databases cannot be found or elements (E) use too many bits in their one or more transmitted reference values (R).

Optionally, in the method, matching of the one or more portions of the source data with one or more elements (E) of the one or more databases is made within a quality threshold, wherein the quality threshold is dynamically altered during generation of the reference values (R).

Optionally, in the method, the one or more reference values (R) are used to reconstruct one or more corresponding portions of the source data using one or more elements (E) defined by the one or more reference values (R), and wherein errors are determined between the reconstructed one or more portions and corresponding original one or more portions in the source data, and the errors are encoded and included in the encoded data.

Optionally, in the method, the one or more data blocks corresponding to the one or more elements (E) are at least one of: 1-D, 2-D or 3-D, polygonal when visually displayed, rectangular when visually displayed, elliptical when visually displayed, circular when visually displayed, elongate when visually displayed, triangular when visually displayed.

Optionally, in the method, one or more elements (E) of a first database are operable to refer to one or more elements (E) present in one or more other of the one or more databases. In other words, an element (E) in a first database can refer to an element (E) in a second database from which a corresponding data block is derived.

Optionally, in the method, one or more reference values (R) included in the encoded data are in a compressed form.

Optionally, in the method, the one or more databases are selected and/or are varied in size depending upon a nature of content present in the source data.

According to a second aspect, there is provided an encoder for encoding source data to generate corresponding encoded data (30), characterized in that the encoder includes:
(a) first data processing hardware for matching one or more portions of the source data to one or more elements (E) in one or more databases, wherein the one or more elements (E) are representative of corresponding one or more data blocks, and recording reference values (R) which relate the one or more portions of the source data to the one or more matched elements (E); and
(b) second data processing hardware for including the reference values (R) in the encoded data together with the one or more databases and/or information identifying the one or more databases,
wherein the source data includes at least one of: audio data, image data, video data, graphics data, multi-dimensional data, measurement data;
wherein the encoder is operable:
(c) to receive the source data in a form of one or more data blocks, to divide the one or more data blocks into areas having a unique area identifier (U);
(d) to take area-specific samples from the areas of the one or more data blocks and to compute corresponding reference values (R) on a basis of the samples; and
(e) to check whether the reference values (R) obtained as a result of the computations applied to the one or more data blocks have already been stored in the one or more databases or transmitted, and to store and/or transmit the computed reference values (R) or the compressed reference values for uniquely identifying elements (E) into the encoded data or to store and/or transmit the encoded and/or original source data to the encoded data and optionally store as a new element (E) into the one or more databases in an event that the reference values (R) have not previously been stored into the one or more databases.

Optionally, in the encoder, the one or more databases include one or more static databases and/or one or more dynamic databases.

Optionally, the encoder utilizes at least one of:
(a) the one or more static databases are generated by selecting elements from one or more dynamic databases;
(b) information present in the one or more portions of the source data is processed to generate one or more elements (E) for inclusion in the one or more dynamic databases; and
(c) selecting elements (E) from one or more earlier databases and including them in the one or more dynamic databases for use with the encoded data.

Optionally, the encoder is coupled via a communication network to the one or more databases, wherein at least one of the one or more databases is in a mutually similar local area network (LAN) of the communication network to that of the encoder. Optionally, the one or more databases are implemented by employing one or more data servers.

More optionally, in the encoder, the first data processing hardware is operable to generate the reference values (R) to include multiple parts which are separately encoded for inclusion in the encoded data. More optionally, the encoder is operable to combine one or more of the multiple parts before encoding them for inclusion in the encoded data.

Optionally, in the encoder, the reference values (R) include information for guiding searching of corresponding one or more elements (E) in the one or more databases.

Optionally, in the encoder, the reference values (R) include parameters from which one or more corresponding data blocks can be computed by interpolation. Optionally, or alternatively, in the encoder, decimation, extrapolation and cropping are employed. Such computations pertain to all such database elements which can be used by scaling upwards or downwards, or by enlarging the values to larger blocks, or by using only a smaller section of the element. Extrapolation and cropping additionally demand information regarding where the extrapolation will take place, and at which part of the block will be cropped, but interpolation and decimation can function automatically according to the relation between the size of the block to be decoded and the size of the block of the database element. Optionally, the methods for interpolation and decimation can be stored and/or transmitted to the encoded data or they could be pre-selected.

Optionally, in the encoder, the one or more dynamic databases are created for a limited time duration, after which they are erased.

Optionally, the encoder is operable to restructure one or more of the databases as a function of a frequency of accessing elements (E) within the databases for rendering more frequently accessed elements (E) faster to access using the reference values (R).

Optionally, in the encoder, elements (E) of the one or more dynamic databases are generated when matches of the one or more portions of the source data with one or more elements (E) in the one or more static databases cannot be found or elements (E) use too many bits in their transmitted reference value(s) (R).

Optionally, in the encoder, matching of the one or more portions of the source data with one or more elements (E) of the one or more databases is made by the first data processing hardware within a quality threshold, wherein the quality threshold is dynamically altered during generation of the reference values (R).

Optionally, in the encoder, the first data processing hardware is operable to use the one or more reference values (R) to reconstruct one or more corresponding portions of the source data using one or more elements (E) defined by the one or more reference values (R), and wherein the first data processing hardware is operable to identify errors between the reconstructed one or more portions and corresponding original one or more portions in the source data, and the second data processing hardware is operable to encode the errors and include them in the encoded data.

Optionally, in the encoder, the one or more data blocks corresponding to the one or more elements (E) are at least one of: 1-D, 2-D or 3-D, polygonal when visually displayed, rectangular when visually displayed, elliptical when visually displayed, circular when visually displayed, elongate when visually displayed, triangular when visually displayed.

Optionally, in the encoder, one or more elements (E) of a first database are operable to refer to one or more elements (E) present in one or more other of the one or more databases.

Optionally, in the encoder, one or more reference values (R) included in the encoded data are in a compressed form.

Optionally, in the encoder, the first data processing hardware is operable to select the one or more databases depending upon a nature of content present in the source data.

According to a third aspect, there is provided a method of decoding encoded data to generate corresponding decoded output data, characterized in that the method includes:

(a) receiving encoded data including reference values (R) and information regarding area identifiers and information regarding one or more databases;
(b) decoding from the encoded data the reference values (R);
(c) accessing one or more elements (E) from the one or more databases as directed by the reference values (R), wherein the one or more elements (E) are representative of one or more corresponding data blocks; and
(d) generating the one or more data blocks for assembling corresponding total decoded output data.

Optionally, the method includes:
(e) maintaining data in a database wherein the data includes at least one of audio data, image data, video data, graphics data, multidimensional data, measurement data corresponding to the reference values (R);
(f) generating area identifiers (U) based on the information regarding area identifiers included in the encoded data
(g) receiving or retrieving from the encoded data a reference value (R) corresponding to one or more area identifiers (U);
(h) retrieving from the database on the basis of the reference value (R) for corresponding one or more area identifier (U) data corresponding to the reference value (R); and
(i) generating, on the basis of the data retrieved from the database, a data block that is assembled to total decoded output data based on the area identifier (U).

In respect of a step (c) of the method, it should be noted that the reference values (R) for elements (E) at the decoder are such as were used in the transmission, namely quantized, and consisting of several sections. For one and the same element (E), several reference values (R) may exist, because the reference value (R) might be in use simultaneously in one or more dynamic databases and/or in one or more static databases. Moreover, some good quality data blocks can be used also in a lower quality data block, and then the portion of the reference value (R) in different quantization levels will produce a different reference value (R) of the block. In other words, a given element (E) can optionally have several reference values (R), but one reference value (R) cannot refer to several elements (E) unless they exist in different databases, or they are used for different qualities, or they do not contain such a property for the element (E) which explicitly and unambiguously can be selected from among several alternatives.

For example, if such elements (E) are used where the mean value has been omitted, then a block with a large amplitude which has been generated by using a large mean value can be used as a negation for a block that has a small mean value, whereas it still can be used for a block with a large mean value as such. If one should try to switch these for one another, then this would yield values that would not lie within the dynamics range of the data values, for example 8-bit data, for which ±8-bit data-valued database elements without mean value are used. If, for instance, the amplitude is 200 and the mean value1 upon storing is 220 and mean value2 upon using is 30, then the use of a negation, or not using a negation, would be clearly deducible. In this case, the data value of a database element without a mean value could be for example. −170, and it could not be used combined with mean value2, but as a negation, +170 for the data value in question would be valid. Thus, the transmitted reference value can therefore contain other information besides sections of reference values or ordinal numbers, although in practice this other information is often advantageously transmitted as a separate piece of coding information. For example, with a database without a mean value, already the mean value alone is a piece of information that is always necessary, and it can be part of the reference value (R) or a separate encoding information insertion.

Correspondingly, if it is desired that one and the same element (E) contains rotated or flipped versions, then for different variations, there can exist a distinct numeric information section in the reference value (R), or alternatively a separate delivery of the encoding information is performed to denote the same information. What is common with all of these is a fact that for one element (E) stored in the database, different decoding blocks can be produced, depending on how those parameters such as the mean value, rotation and flipping are set, similarly for scaling, cropping, extrapolation, and so forth.

A part of these pieces of information are such that on a basis of other information already received, or on a basis of earlier decoded blocks, a correct variation can be deduced, but correspondingly, a part of them will have to be transmitted so as to render a decoding method unambiguous, if use of alternatives is allowed in the decoder. For example, a relation between the amplitude and the mean value with the negation is deductible with large amplitudes and with small or large mean values, but otherwise, it is not deductible. Correspondingly, on the basis of earlier decoded blocks, it can often be deduced based on connectivities which rotation or flipping would be the correct one. However, in all cases where a deduction is not unambiguously clear, it is necessary to transmit additional information, either as part of the reference value (R) or as a separate piece of information.

Optionally, in the method, the one or more databases include one or more static databases and/or one or more dynamic databases.

Optionally, in the method, the one or more databases are spatially disposed locally to data processing hardware arranged to execute the method. More optionally, in the method, the one or more databases are hosted in a LAN which also includes the data processing hardware.

Optionally, the method includes generating one or more dynamic databases from one or more elements (E) of the one or more static databases and/or from information provided in the encoded data, wherein the generated one or more dynamic databases are employed for decoding the encoded data.

Optionally, the method includes generating from the one or more elements (E) corresponding one or more data blocks which are at least one of: 1-D, 2-D or 3-D, polygonal when visually displayed, rectangular when visually displayed, elliptical when visually displayed, circular when visually displayed, elongate when visually displayed, triangular when visually displayed.

According to a fourth aspect, there is provided a decoder for decoding encoded data to generate corresponding decoded data, characterized in that the decoder includes:
(a) first data processing hardware for receiving encoded data including reference values (R) and information regarding area identifiers (U) and information regarding one or more databases;
(b) second data processing hardware for decoding from the encoded data the reference values (R);
(c) third data processing hardware for accessing one or more elements (E) from the one or more databases as directed by the reference values (R), wherein the one or more elements (E) are representative of one or more corresponding data blocks; and
(d) fourth data processing hardware for generating the one or more data blocks for assembling corresponding total decoded output data It will be appreciated that the first and second data processing hardware can be the same processing unit or separate processing units. Similarly, there could be many processing units performing the functions of the first and/or second processing hardware. The possibilities for implementation are numerous, and are not be limited to examples described herein.

Optionally, the decoder is configured:
(e) to maintain in a database reference values (R) and data wherein the data includes at least one of audio data, image data, video data, graphics data, multidimensional data, measurement data corresponding to the reference values (R);
(f) to generate area identifiers (U) based on the information regarding area identifiers included in the encoded data;
(g) to receive or to retrieve from the encoded data a reference value (R) corresponding to one or more area identifiers (U);
(h) to retrieve from the memory on the basis of the reference value (R) for one or more area identifier (U) data corresponding to the reference value (R); and
(i) to generate, on the basis of the data retrieved from the database, a data block that is assembled to total decoded output data based on the area identifier (U).

Optionally, in the decoder, the one or more databases include one or more static databases and/or one or more dynamic databases.

Optionally, in the decoder, the one or more databases are spatially disposed locally to the data processing hardware of the decoder. More optionally, in the decoder, the one or more databases are hosted in a LAN which also includes the data processing hardware of the decoder. Alternatively, or additionally, the one or more databases are located at the decoder, for example in its data memory (RAM, ROM).

Optionally, the decoder is operable to generate one or more dynamic databases from one or more elements (E) and/or one or more static databases and/or from information provided in the encoded data, wherein the one or more generated dynamic databases are employed for decoding the encoded data to generate the corresponding decoded data.

Optionally, the decoder is operable to generate the one or more data blocks from the one or more elements (E), wherein the one or more data blocks are at least one of: 1-D, 2-D or 3-D, polygonal when visually displayed, rectangular when visually displayed, elliptical when visually displayed, circular when visually displayed, elongate when visually displayed, triangular when visually displayed.

According to a fifth aspect, there is provided a codec including at least one encoder pursuant to the second aspect for encoding source data to generate corresponding encoded data, and at least one decoder pursuant to the fourth aspect for receiving the encoded data and for decoding the encoded data to generate corresponding decoded data.

Optionally, the codec is incorporated into one or more consumer electronics products, for example personal computers (PC), video recorders, video players, smart telephones, gaming devices, scientific equipment, medical equipment, surveillance apparatus, security apparatus, sensors and other measurement apparatus and digital cameras.

Optionally, the codec is implemented such that the at least encoder and the at least one decoder share one or more databases referred to by reference values (R) included in the encoded data.

According to a sixth aspect, there is provided a software product recorded on non-transitory machine-readable data storage media, characterized in that the software product is executable on computing hardware of an encoder for implementing a method pursuant to the first aspect.

According to a seventh aspect, there is provided a software product recorded on non-transitory machine-readable data storage media, characterized in that the software product is executable on computing hardware of a decoder for implementing a method pursuant to the third aspect.

It will be appreciated that features of the invention are susceptible to being combined in various combinations without departing from the scope of the invention as defined by the appended claims.

DESCRIPTION OF THE DIAGRAMS

Embodiments of the present disclosure will now be described, by way of example only, with reference to the following diagrams, wherein.

In the accompanying diagrams, an underlined number is employed to represent an item over which the underlined number is positioned or an item to which the underlined number is adjacent. A non-underlined number relates to an item identified by a line linking the non-underlined number to the item.

DESCRIPTION OF EMBODIMENTS

When describing embodiments of the present disclosure in the following, abbreviations are employed as provided in Table 1:

TABLE 1 details of acronyms employed to describe embodiments

| Acronym | Detail |
| --- | --- |
| 1D | 1-Dimensional, for example referring to a signal or data packet |
| 2D | 2-Dimensional, for example referring to a signal or data packet |
| 3D | 3-Dimensional, for example referring to a signal or data packet |
| Block | Multiple data elements from digital data, namely a part of digital data |
| CRC | Cyclic redundancy check |
| Codec | Encoder and decoder for digital data |
| DB | Database in RAM-based or ROM-based memory |
| DC | DC-component of an image, namely an image mean, corresponding to an average brightness and represents a lowest spatial frequency present in the image |
| Delta Coding | Delta coding is a way of storing or transmitting data in a form of differences between sequential data rather than complete data files |
| DCT | Discrete Cosine Transform |
| ISP | Internet Service Provider |
| LAN | Local Area Network |
| RAM | Random Access Memory |
| RD | Rate-Distortion |
| RLE | Run-Length Encoding |
| ROI | Region of Interest |
| ROM | Read Only Memory |
| VLC | Variable-Length Code |
| XOR | Exclusive Or (logic function) |

Figure 1:
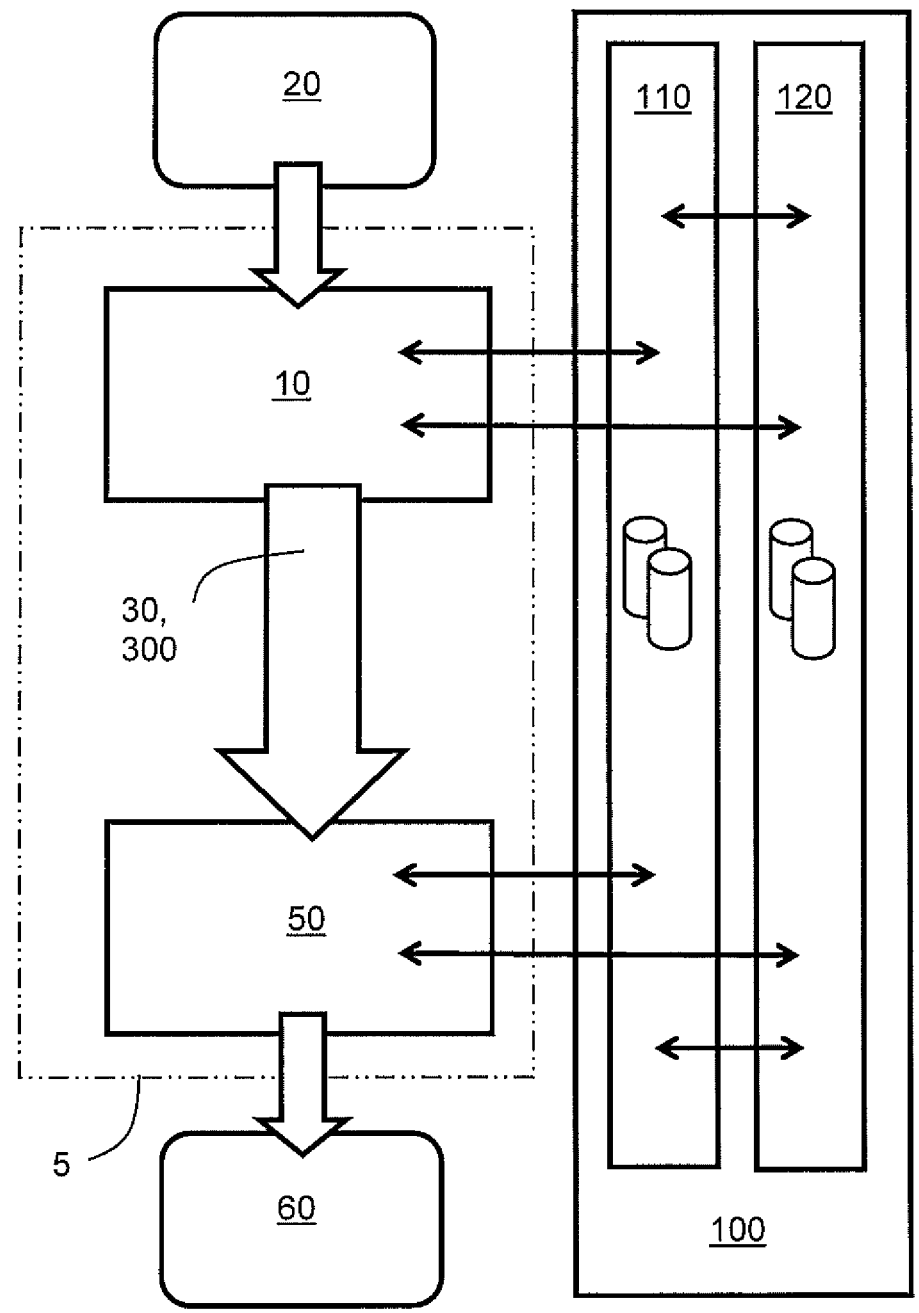
FIG. 1 is a schematic illustration of an encoder and a decoder, namely in combination constituting a codec, pursuant to the present disclosure.

In overview, as illustrated in FIG. 1, the embodiments are concerned with an encoder 10 for encoding source data 20 to generate corresponding encoded data 30, and a decoder 50 for receiving and decoding the encoded data 30 to generate corresponding decoded data 60; in combination, the encoder 10 and the decoder 50 constitute a codec 5. The decoded data 60 is optionally a representation of the source data 20, for example at least one of: audio, 1-D images, 2-D images, 3-D images, video content, graphics data, captured audio, captured images, captured video, ASCII and binary data as well as measurement data and generated data. The encoder 10 and the decoder 50 are operable to employ one or more databases 100 for encoding the source data 20 and for decoding the encoded data 30. Moreover, the one or more databases 100 include one or more static databases 110 and/or one or more dynamic databases 120 as will be described in greater detail later. Optionally, the one or more databases 110, 120 are provided via one or more data servers, for example spatially remote from the encoder 10 and the decoder 50. Optionally, there is provided at least one same database 100 for both the encoder 10 and the decoder 50; such an arrangement is capable of providing greater data security as multiple copies of data do not need to be made available within a data communication network, for example at a plurality of spatially spaced-apart data servers, for example implemented as a peer-to-peer network of data servers. Alternatively, optionally, the one or more databases 100 are arranged so that the encoder 10 and the decoder 50 each have their own dedicated encoder databases and decoder databases respectively, for example hosted from one or more data servers.

It will be appreciated that the one or more databases 100 can be implemented in many different manners. For example, when one or more of the encoder 10 and the decoder 50 requires information from the one or more databases 100, for example implemented as one or more data servers, the information can be provided in a direct manner, alternatively in an indirect manner. In a direct manner, the encoder 10 and/or the decoder 50 sends a request to one or more of the data servers to supply information; the one or more data servers then supply the information to the encoder 10 and/or the decoder 50, for example encryption information, encoding method information, decoding method information, a library of image elements and so forth. In an indirect manner, the encoder 10 and/or decoder 50 sends a first request to one or more of the servers which, in response, provide information regarding one or more other servers from where the information is available; the encoder 10 and/or the decoder 50 then sends a second request to the one or more other data servers to supply the information to the encoder 10 and/or the decoder 50. Optionally, more than two levels of request, in respect of data servers, are employed. Optionally, at least one of the first request and the second request are encrypted to prevent unauthorized encoding and/or decoding, for example to prevent unauthorized file delivery, which is a major problem for the contemporary music industry. Optionally, the first request is sent to a spatially remote data server, and the second request is sent to a spatially near data server; information traffic associated with the first request is optionally modest, thereby being easily accommodated by communication networks, whereas information traffic associated with responding to the second request may be considerable and is most conveniently accommodated spatially locally to the encoder 10 and/or the decoder 50. Optionally, the first request includes position information indicative of where the encoder 10 and/or decoder 50 are disposed spatially or within a communication network, and the response to the first request includes information regarding a spatially nearest suitable database, or nearest suitably-connected database, for example data server, to the encoder 10 and/or the decoder 50 which can supply relevant encoding and/or decoding information to the encoder 10 and/or decoder 50. Optionally, the response to the first request provides the encoder 10 and/or decoder 50 with a choice of a plurality of possible databases which can supply suitable information; optionally, the choice is based on one or more technical criteria, for example fastest possible data connection, least energy consuming data connection, least expensive data connection, although not limited thereto. Although a situation of a first request and a second request is elucidated here, it will be appreciated that optionally more than two requests can be employed if required, for example multi-requests, for example to render unauthorized decoding of encoded content even more difficult to achieve by unauthorized parties.

Optionally, one or more access codes for enabling the decoder 50 to obtain data for decoding content data thereat are distributed from a central location so that a plurality of such decoders 50 are enabled substantially temporally simultaneously, for example in an event of a new blockbuster film being released and distributed via a communication network, wherein release of the film for viewing is desirably coordinated and controlled. Such control also enables post-release censorship of video content to be achieved, for example in an event of a court injunction or copyright infringement being imposed.

Embodiments may employ techniques as described for an image generator as described in US Patent Publication No. 2010/322301 ("Image Processor, Image Generator and Computer Program"; Inventor—Tuomas Karkkainen; Applicant: Gurulogic Microsystems Oy, 2009) whose contents are hereby incorporated by reference. However, the embodiments employ such techniques, and others, in more efficient manners and in a generic way.

In embodiments of the present disclosure, the one or more dynamic databases 120 and their associated elements E are created when the encoded data 30 is delivered from the encoder 10 to the decoder 50. Moreover, the one or more static databases 110 are created from the one or more dynamic databases 120, or are delivered earlier before the encoded data 30 is delivered to the decoder 50, or is pre-installed into the decoder 50.

When new database elements E are delivered to the decoder 50, they are optionally sent together with one or more reference values R, partially with a reference value R, or without a reference value R, depending upon a coding algorithm employed. The encoder 10 and the decoder 50 are operable to compute the entire reference value R, or a part of the reference value R of a given database element E, directly from the data that is to be stored in the given database element E, namely in a manner of a reconstructed data block. Moreover, in respect of the given database element E, an error detection mechanism is implemented, when at least a part of the computed reference value R of the given database element E is delivered between the encoder 10 and the decoder 50.

The encoder 10 and the decoder 50 are operable to encode and decode respectively data which, at least part, has been encoded pursuant to known encoding standards as provided in Table 2:

TABLE 2

Encoding standards which are employable in conjunction with embodiments of the present disclosure

| JPEG | JPEG MVC | Lucid | AAC |
| JPEG2000 | MP3 | GIF | FLAC |
| JPEG XR | H.261 | PNG | Ogg Vorbis |
| MPEG-1 | H.263 | TIFF | Speex |
| MPEG-2 | H.264 | BMP | Opus |
| MPEG-4 | WebP | VC-1 | 7Zip |
| MPEG-4 AVC | VP8 | Theora | HVEC |
| VP9 | RAR | ZIP | |

In FIG. 1, data for the elements E in the one or more databases 100 are encoded for transmission from the encoder 10 to the decoder 50, which enables the delivery of database elements E simultaneously when encoded image data, or other types of data such as audio data, video data, graphics data, multidimensional data, measurement data, text data, binary data, is being delivered. Elements E are often created from the encoded data, namely after decoding. Moreover, encoding of elements E from the one or more databases 100 enables efficient database delivery between the encoder 10 and the decoder 50, namely enabling efficient storage of the database 100 in devices employed, for example, to implement the decoder 50. In an event that the one or more static databases 110 are employed, the encoder 10 and the decoder 50 are made aware of available databases; alternatively, the encoder 10 and the decoder 50 mutually communicate to determine which databases are available for use. Optionally, both the encoder 10 and the decoder 50, by way of mutual dialogue, are operable to define which databases are to be used, for example one or more data servers, prior to encoded data being communicated from the encoder 10 to the decoder 50, wherein the databases are employed for decoding the encoded data 30 at the decoder 50 to generate the decoded data 60.

The encoder 10 and the decoder 50 are employed in a large range of practical applications as provided in Table 3, for example in various industries:

TABLE 3 practical applications of the encoder 10 and the decoder 50

| Video communication | Displays | Satellite systems | Desktop computers |
| Security systems | Televisions | Printers | Laptop computers |
| Audio/image/video streaming services | Projectors | Scanners, for example document scanners | In-vehicle crash recorders for recording shortly prior to an accident occurring |
| Medical and military applications | Holographic projectors | Copy machines, for example photocopying machines | Scientific instruments, for example astronomical telescopes, optical microscopes |
| Mobile device (wireless communication devices), such as pads and cell phones. | Digital cameras | Sensor nodes | |

Such practical applications as listed in Table 3 employ an encoder, as described in a United Kingdom patent application GB1214414.3 and equivalent U.S. patent application Ser. No. 13/584,005 as well as corresponding European patent application EP13002521, all hereby incorporated by reference, and a decoder, as described in a United Kingdom patent application GB1214400.2 and equivalent U.S. patent application Ser. No. 13/584,047 as well as corresponding European patent application EP13002520, all hereby incorporated by reference. Further pending patent applications such as GB1218942.9 and equivalent U.S. patent application Ser. No. 13/657,382 as well as corresponding European patent application EP13003859, GB1303658.7 and equivalent U.S. patent application Ser. No. 13/782,757, GB1303661.1 and equivalent U.S. patent application Ser. No. 13/782,819, GB1303660.3 and equivalent U.S. patent application Ser. No. 13/782,872, GB1312815.2, and GB1312818.6 are all hereby incorporated by reference.

In overview, the codec 5 of FIG. 1 is operable such that digital data, for example video, image, graphics and audio content, to be communicated from the encoder 10 to the decoder 50 is often mostly or completely built from database elements E derived from the one or more databases 100.

The one or more databases 100 used can depend upon one or more factors:

(i) the one or more databases 100 used can vary in size, for example are based upon the type of data content being transmitted from the encoder 10 to the decoder 50;

(ii) the one or more databases 100 used can depend upon a required data reconstruction quality at the decoder 50;

(iii) the one or more databases 100 used can depend upon data size to be transmitted from the encoder 10 to the decoder 50;

(iv) the one or more databases 100 used can depend upon a bandwidth available for transmitting the encoded data 30 from the encoder 10 to the decoder 50;

(v) the one or more databases 100 used can depend upon a bandwidth available between the one or more databases 100 and the decoder 50 and/or the encoder 10;

(vi) the one or more databases 100 used can depend upon a response time between the one or more databases 100 and the decoder 50 and/or the encoder 10;

(vii) the one or more databases 100 used can depend upon a cost, namely financial price, of accessing data therefrom;

(viii) the one or more databases 100 used can depend upon a function of data errors arising in data supplied therefrom;

(ix) the one or more databases 100 used can also depend upon spatial (geographical) locations of the databases and are optionally also taken into account; although not limited to such a selection.

Moreover, in the encoded data 30, one or more database references R which are communicated are stored and sent instead of encoded data blocks. To achieve such a manner of data communication from the encoder 10 to the decoder 50, the one or more static and dynamic databases 110, 120 need to be as large as possible. Whereas larger databases require more memory capacity for their storage, such larger databases enable the codec 5 to achieve a better reconstruction quality in the decoded data 60. The codec 5 is operable to select amongst the databases 100 to find a combination thereof which is most appropriate for a given type of data to be communicated in the encoded data 30, for example video, image, graphics and audio content, namely to achieve efficient usage of the databases 100 and a corresponding increased compression ratio. However, it will be appreciated that database reference values R require more data bits when the databases 100 are larger and include more elements E.

For efficient use of the one or more databases 100, there are generated several static databases 110 for common digital data, for example video, image, graphics and audio content. One or more static databases 110 can be used in conjunction with the encoder 10 for providing data compression in respect of the encoded data 30. For example, a static database 110 is selected depending upon a type of digital data content to be encoded, and the static databases 110 can vary widely according to their size, depending upon memory capacity to be used and also upon required reconstruction quality to be achieved at the decoder 50; the static databases 110 can vary in respect of sizes of data blocks employed, the number of database elements E employed and so forth.

The encoder 10 and the decoder 50 in combination constitute the codec 5 as aforementioned, wherein one or more dynamic databases 120 are used when communicating data from the encoder 10 to the decoder 50. A dynamic database 120 contains often different elements E in comparison to a static database 110, because elements E of the dynamic database 120 are typically created by the encoder 10 when there have not been enough suitable elements in the static database 110 when encoding the source data 20. However, both the encoder 10 and the decoder 50 as aforementioned optionally may need to create one or more dynamic databases 120 during encoding of the source data 20 and decoding of the corresponding encoded data 30, so that compatibility between the encoder 10 and decoder 50 can be guaranteed, and the reconstructed decoded data 60 will substantially match, for example, to the source data 20. The one or more dynamic databases 120 are optionally created for temporary use, for example for a defined interval of video frames when the encoded data 30 includes video content; moreover, the one or more dynamic databases 120 are optionally recreated, for example every second, and can be used for a period thereafter for a period of 30 seconds before being erased. The period optionally varies in a range of few seconds to entire video scenes and movie chapters, for example for minutes of encoded video content. Optionally, it is feasible to create a new static database 110 from elements E generated for earlier created one or more dynamic databases; in other forms, created dynamic databases 120 can be rendered constant in their content and thereafter are operable to function as static databases 110.

The codec 5 pursuant to the present disclosure, namely comprising the encoder 10 in combination with the decoder 50, regardless of what type of database 100 is employed, whether static or dynamic, is capable in operation of reducing a processing time, namely processing resources and data memory capacity required, when storing and transmitting data corresponding to the encoded data 30, for example video, image, graphics and audio content. Such benefit may be important when the encoded data 30 is to be communicated via data communication networks, for example wireless communication networks and the Internet, because the encoded data 30 is less challenging for the communication networks to accommodate, for example in a real-time streamed manner.

In comparison to an image generator as described in a published US Patent Publication No. 2010/322301, the codec 5 in FIG. 1 is capable of providing a greater degree of data compression in the encoded data 30. The improved compression relates both to sending reference values (R) as well as the information related to area identifiers (U). Area identifiers (U) in a context of the present disclosure are employed to convey spatial information of where a given block is derived in corresponding data, for example in an original image, in original sensor data and similar. The area identifier (U) describes the size, shape and the location of a data block in the data. Optionally, the area identifier (U) is sent with a corresponding block, but this is often a too inefficient method. When implementing embodiments of the present disclosure, information regarding area identifiers (U) are optionally communicated as an alternative merely to communicating the area identifiers (U) themselves. For example the area identifiers (U) are optionally obtained during decoding from the encoded data based on information pertaining to the area identifiers (U), for example split/combine information. More optionally, the area identifiers (U) can be pre-set and no other information needs to be delivered. The database does not in any way edit or fetch the area identifiers (U), but instead the elements (E) retrieved from the database based on reference value (R) are taken and their reconstructed data blocks are placed into the reconstructed result data to a location pointed to by the area identifier (U).

Sometimes, the information on area identifiers (U) is pre-set in the data, for example the blocks are equal-sized, and they are coded in a certain order; in this case, no actual new information needs to be transmitted. As there is no extra information in the data on area identifiers (U) to alter the pre-set way to generate area identifiers (U) for incoming encoded data block according to their order, it is self-evident that the pre-set way is utilized.

On occasions, there is optionally transmitted information denoting one or more desired block sizes and processing order, or the one or more block sizes and processing order selected out of several alternatives are transmitted. Sometimes, the encoder may transmit to the decoder also such split/combine information that defines the sizes, shapes and locations of the data blocks and also their processing order, so that a received and decoded data block, for example a data block retrieved from the database, can always unambiguously and uniquely be placed into the right location in the reconstructed result data.

This sort of split/combine information for defining area identifiers (U) can be transmitted for example by using the coding solution presented in U.S. patent application Ser. Nos. 13/584,005 and 13/584,047.

The area identifiers (U) are optionally generated in many ways, depending on a coding method employed. Optionally, in block encoders/decoders as aforementioned, hereby incorporated herein by reference, the area identifier information (U) is derived from split/combine information when splitting/combining the blocks, and sometimes the area identifier information (U) is already available or known, in which case information related to area identifiers (U) is simply information of the area identifier (U) which is already available and/or known.

Sometimes, on account of the method used in transmission and storage, the order of encoded data cannot be guaranteed. For that reason, there are optionally employed more area identifiers (U) in the data than necessary for actual data encoding and data decoding. Moreover, one area identifier (U) is optionally inserted, for example, to each data chunk to express where the first data block corresponding to that data chunk is located. Similarly, sometimes an order number is optionally added to each data chunk to denote the order of data chunks. This information then avoids a need for additional area identifiers (U). This embodiment may be optionally used together with a solution that uses changed and unchanged data blocks as described for example in U.S. Pat. No. 8,169,547. If there is a solution that delivers only changed data blocks, then area identifiers (U) need to be used to describe the position of those changed blocks, especially, if there is no other information that describes the changed data block positions uniquely.

Figure 2:
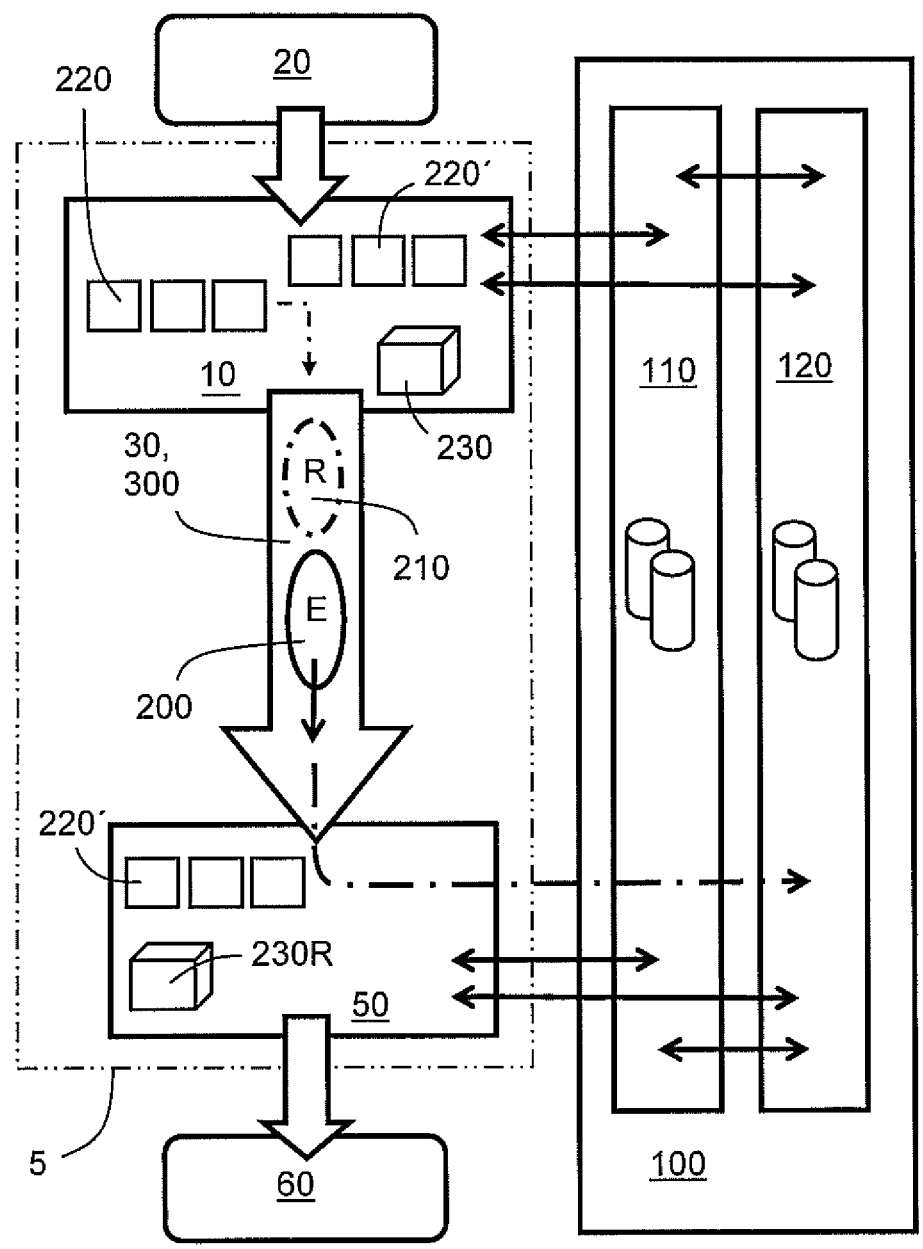
FIG. 2 is a schematic illustration of a new element being sent in the codec of FIG. 1.

Such increased data compression is achieved, as illustrated in FIG. 2, by communicating a new element E 200 of a dynamic database 120 from the encoder 10 to the decoder 50, without needing to send its corresponding reference value R 210 together with the new element 200. Such a characteristic is accomplished by all reference values R for the elements E 200 for digital data blocks 220 being susceptible to being recomputed using computing hardware 230, 230R from the reconstructed data block 220', both in the decoder 50 and in the encoder 10. It will be appreciated that as such, the element E 200 is just a part of the encoded data 30 sent from the encoder 10 to the decoder 50. Optionally, a part of the reference value R contains information that is otherwise present in both the encoder 10 and the decoder 50, for example derived from how many database elements E are already available in the one or more databases 100, or is otherwise possible to (re)calculate based on the encoded data block (after decoding). In addition to the amount/count, for example, the order of probability of the elements E can influence a numeric part of the reference value R. Moreover, the aforementioned amount/count or order of probability does not always have to refer to an entire database, but instead, for example, it can refer to a selected combination of the transmitted reference values R, for which combination therefore can be given more than one different variation with the help of this value.

The encoder 10 and the decoder 50 employ a method of computing reference values R which has hitherto not been known. The encoder 10 is operable to reconstruct, namely to quantize and to de-quantize, data block values before computing corresponding reference values R. For this reason, each data block 220 can be encoded in the encoder 10 using any known lossy or lossless compression algorithm, for example as provided in Table 2, or by a combination of such lossy or lossless compression algorithms; the codec 5 of FIG. 1 can thus be versatile in respect of compression algorithms that it employs which can provide major data compression benefits. These methods include but are not limited to DC, slide, line, multilevel, DCT, interpolation and extrapolation. The database elements 200 can also be created for any block size and from any position of a decoded image, for example. The reference values R contain a plurality of component parts that can be computed independently, for example one component describes a mean of block values, another component describes a variance of the block values, yet another component describes an amplitude of the block values, a yet further component describes a check-sum for the block values or the elements E included in a given database 100. Moreover, the entire reference value R, or a part of the reference value R, is also optionally delivered to the decoder 50 together with the encoded data 30; such information is employed for assessing correctness of delivery, for example any quality degradation arising from transmitting the encoded data 30 from the encoder 10 to the decoder 50. Optionally, the decoder 50 is operable to return the entire reference value R, or a part thereof, back to the encoder 10, for example for validation purposes and/or quality control purposes.

The aforementioned database reference values R require more data bits when the given database 100 is larger. A number of uncompressed data bits required for defining one unique database reference value R can be computed by taking the $\log_2$ value of the number of elements E 200 in the database 100. Thus, larger database reference values R will require more bits, and the compression ratio achievable in the encoded data 30 is decreased for each existing database data block. Usually, in the database reference value R there are one or more bits that are reserved for unused data elements E. However, in order to avoid having excessive unused database elements E in a large static database 110, or a dynamic database 120, elements E of a new smaller dynamic database 120 can be created from the elements E of a used static database 110, or a used dynamic database 120. The new smaller dynamic database 120 can then be used in the decoder 50 for decoding purposes, wherein the new dynamic database requires fewer bits in its reference values R for uniquely identifying elements E present in the new small dynamic database in comparison to the larger original database.

It should be noted that the reference value R mentioned here is precisely the transmitted reference value (index that uniquely specifies the element E in database), which thus receives a smaller bit count in the new, smaller database than the original transmitted reference value uses in the old, larger database. This of course has no effect on the actual precise reference value R that is used in the search, because that depends on the actual data value of the element E, which are not altered in any way here.

The reference value R for the new dynamic database can be, for example, the total number of the elements E present in the new database. Optionally, this reference value R, corresponding to a database element E in the new dynamic database, includes actual data, or it can be linked to another larger database. When the new dynamic database is used for coding the reference values R, it is found that the reference values R can be compressed efficiently by employing a known coding algorithm, for example known delta coding. Thus, using the new dynamic database, it is feasible to save considerable uncompressed reference value R bits, with substantially no decrease in performance or quality of the decoded data 60 which is output from the decoder 50.

As an example:

(a) if a given static database 110 contains 16 million elements E, expressible using 24-bits of data for the corresponding data values R;

(b) a dynamic database 120 contains only 1024 elements E, expressible using 10 bits of data for the corresponding data values R; and (c) a data block exists in the dynamic database 120 with a certain data block index, then the reference value R will require only 10 bits to define the data block uniquely via the dynamic database 120, compared with 24 bits to define the data block uniquely if it were included in the static database 110. If a given data block is transferred from the static database 110 to the dynamic database 120 in this example, fewer bits are required for uniquely identifying the data block; the encoder 10 informs the decoder 50 regarding moving, or copying, of one or more data blocks from the static database 110 to the dynamic database 120. The codec 5 of FIG. 1 is also optionally capable of operating in a manner such that one or more data blocks are moved, or copied, from the static database 110 to the dynamic database 120 depending upon an amount of database usage that occurs for the one or more data blocks. In other words, when encoded reference values R refer to a given data block frequently, the data block at the decoder 50 is obtained from a given dynamic database 120 transferred to the decoder 50, or made accessible to the decoder 50, rather than from the static database 110 transferred to the decoder 50, or made accessible to the decoder 50. As aforementioned, the databases 110, 120 are optionally hosted by one or more data servers, for example belonging to one or more third parties.

The codec 5 of FIG. 1 allows for saving bits for database reference values R by creating a small-sized static or dynamic database from the most used database elements E of the larger static or dynamic databases 100. In the codec 5, the dynamic databases 120 and/or the static databases 110 of larger size maintain a usage counter for all existing data blocks and new databases are created by selecting elements E as a basis of such usage counter information. Such a smaller database is created during encoding in the encoder 10, and then communicated or otherwise made available to the decoder 50 for decoding the encoded data 30; such a smaller database otherwise made available can include, for example, the encoded data 30 including a URL link to the smaller database made available for downloading to the decoder 50 from a remote Internet-based server and/or from database servers in a client LAN, for example hosted in a cloud computing environment and accessible to many such decoders 50, alternatively hosted in a similar LAN to that of the decoder 50.

When encoding the source data 20, the encoder 10 is operable at every moment to select how many different databases 100, what kind of databases 100 and which particular databases 100 are to be used to decode the corresponding encoded data 30 when received at the decoder 50, wherein information describing the selection of database 100 made by the encoder 10 is communicated to the decoder 50. This information can be provided locally, namely as in application-dependent database information, or globally, namely always the same database information. In certain situations, the selected database is already known to the decoder 50 and in such cases, no specific information needs to be communicated, stored and/or transmitted, namely the information can also be something already known to the decoder 50. Conveniently, the information describing the selection of database 100 as well as selection of the used encoding method is stored in a video header or container of the encoded data 30. Moreover, the decoder 50 is optionally equipped with all of the one or more static databases 110 before executing a task of decoding the encoded data 30. In an event that the decoder 50 discovers that it lacks a given database defined in the encoded data 30, the decoder 50 sends a request to the encoder 10 for the missing given database to be sent, or otherwise made available, for example from a remote network-connected data server, to the decoder 50. Optionally, the remote server is located relatively close to the decoder 50, for example within a mutually similar LAN network, thereby providing fast delivery of missing databases 100 to the decoder 50. Optionally, the missing databases are provided in compressed format to the decoder 50, such that the decoder 50 operates to decompress the missing databases for storage in data memory of the decoder 50. Beneficially, data blocks that are most frequently utilized by the decoder 50 are beneficially stored in a small static database 110.

In order to free resources from RAM, either in the encoder 10 or the decoder 50 or both, unused database elements are removed. Usage of database elements E are measured by counting the number of used elements E in the database, or by keeping statistics for when the database elements E were last used. In the codec 5 of FIG. 1, all the dynamic databases 120 are processed for clean-up purposes for removing unused elements E. Optionally, the static databases 110 are also subject to clean-up; alternatively, the one or more of the static databases 110 are periodically replaced with new static databases for clean-up purposes. Optionally, old databases 110 can also be transferred to a backup memory so that they can be accessed at a later occasion if necessary for returning to the encoder 10 and/or to the decoder 50, but do not take up memory capacity in the static databases 110; the backup memory is implemented via a hard drive, a flash memory, external memory, an optical disc data ROM, a cloud-based data repository and so forth. In operation, the decoder 50 is notified of any aberrant change in one of the databases 100, for example for enabling the decoder 50 to request an update of its databases 100 to address any such aberration. The databases 100 are also identified by unique identifiers, for example version numbers. If one or more of the databases 100 are changed, for example at the encoder 10, it is desirable that only changes in the databases 100 are communicated to the decoder 50, rather than transferring the entire databases 100 to the decoder 50. Optionally, the one or more databases 100 can be updated with encoders, for example known types of encoder; moreover, the encoder 10 is optionally provided with an associated preloaded static database 110, for example stored in solid-state ROM. Furthermore, when the one or more dynamic databases 120 are updated in the decoder 50, different modes of updating can be employed; for example:

(i) in a first mode of updating, an old element E is overwritten by a new element E; and (ii) in a second mode of updating, an old element E is retained, and the new element E is added to increase the size of the one or more dynamic databases 120.

Optionally, when a small dynamic database 120 is full, namely all elements E thereof allocated, the small dynamic database 120 is inspected, using one or more automated software tools executing upon computing hardware, to determine which elements E of the small dynamic database 120 are used most frequently, and then the elements E within the database 120 are sorted, such that the most frequently used elements E are moved to a beginning of the database 120, for example for rendering the database 120 faster to access for the more frequently used elements E and/or for rendering the database 120 more efficiently compressible, for example for communication from the encoder 10 to one or more decoders 50 via a data communication network, for example Internet or wireless data communication network; other less frequently used elements E of the small dynamic database 120 are freed. Both the encoder 10 and the decoder 50 perform such inspection and sorting when the one or more databases 120 are full. Optionally, such inspection and sorting is initiated by an instruction which is sent out from the encoder 10.

When data storage or data transmission is initialized, the encoder 10 is operable to select which of the databases 100 are to be subsequently used by the decoder 50, for example whether or not the databases 100 are empty at commencement of decoding the encoded data 30, or whether or not the databases 100 already contain some database elements E at commencement of decoding the encoded data 30. For example, the decoder 50 optionally commences decoding the encoded data 30 by employing a small generic static database 110, wherein the decoder 50 proceeds to populate a dynamic database 120 with missing elements E which the encoder 50 determines from data blocks included in the encoded data 30; the dynamic database 120 is then cleaned up when necessary by using rules as defined in the foregoing. Optionally, the generated dynamic database 120 is stored by the decoder 50 as a new static database 110 for future use when decoding future encoded data 30 received at the decoder 50.

When encoding the source data 20, for example corresponding at least one of video, image, graphics and audio content, the encoder 10 optionally sends database reference values R of a given data block, even if a database including the data block does not yet exist at the decoder 50, for example in an event that the encoder 10 knows that the decoder 50 can fetch a suitable static database 110 including an element E describing the given data block from some static database storage available locally to the decoder 50, for example located on a similar LAN, ISP or other server to the decoder 50. Such an approach enables one encoder 10 to deliver the same encoded data 30 to many decoders 50 that have slightly different databases available to them. When such a method is employed, the decoders 50 do not need to host large static databases or related resources. Thus, the encoder 10 negotiates with the decoder 50 if such a method can be employed. For the method to be successful, the encoder 10 needs to be aware of public and/or private databases that the decoder 50 is capable of accessing for providing the decoder 50 with the one or more databases 100 that it requires for executing decoding of the encoded data 30 sent from the encoder 10. This method is well suited when there is no need to send encoded data blocks at all, when such supply of data blocks to the decoder 50 from another encoder is feasible, wherein the another encoder has encoded the encoded data earlier. Optionally, the data blocks are communicated from other encoders in a peer-to-peer communication manner. Moreover, the method is suitable for live streaming of encoded video data via the Internet, thereby enabling the encoded video data to be streamed from a long distance remotely from the decoder 50, wherein the data blocks can be sourced locally to the decoder 50; in such a case, only substantially reference values R are communicated from a location which is the long distance away from the decoder 50.

As aforementioned, the one or more dynamic databases 120 are constructed from database elements E which are generated or copied from reconstructed data blocks, either at the encoder 10 or at the decoder 50. The data blocks can be 1-D, 2-D or 3-D, or any combination thereof. Optionally, the data blocks can be size and shape, for example when viewed on a display, for example of polygonal, rectangular, elliptical, circular, elongate, triangular form to mention a few examples.

Optionally, in respect of the 1-D data block, its shape can be a set of one-dimensional data items when presented in the decoded data 60. Moreover, optionally, in respect of the 2-D data block, its shape can be a square, a rectangle, a triangle, a parallelogram or a circle when presented in the decoded data 60. Furthermore, in respect of the 3-D data block, its shape can be more polymorphous such as a cube, a pyramid, a cylinder, a ball and so forth; such a 3-D data block, for example, may be beneficial when the decoded data 60 is intended for 3-D graphic displays, for example for conveying 3-D images for user-viewing. A commonly employed 2-D data block corresponds to 8×8 pixels or similar display elements which is employed in embodiments of the present disclosure; there are multiple different and very efficient known coding methods for 8×8 pixel block sizes which can be utilized by the encoder 10 when generating the encoded data 30.

In order to elucidate the present disclosure in greater detail, encoding of data blocks in the encoder 10 will now described.

STEP 1: In an ideal situation, a given database reference value R is computed for a corresponding given data block present in the source data 20, for example for a portion of an image and/or audio present in the source data 20. If there is suitable existing element E in the one or more databases 100, namely a match can be found for the given data block with the existing element E in the one or more databases 100, the reference value R is computed to select the existing element E from the one more databases 100. The match is determined subject to an error between the given data block and the existing data block being below a defined threshold, wherein the defined threshold corresponds to an encoding quality index.

STEP 2: if a match is made in the STEP 1, the reference value R for the selected existing data block is stored or sent, for example in the encoded data 30. The selected existing data block can be searched from a plurality of databases 100, wherein the reference value R stored or sent also includes an identifier of the database 100 wherein the selected existing data block can be found by the decoder 50. Conversely, if a suitable match in the STEP 1 cannot be found, then the given data block is encoded, for example using DC-encoding, slide-encoding, multilevel-encoding, DCT-encoding or any other suitable encoding algorithm, and a database reference value (R) is computed for the reconstructed data block; the encoded data block is included in the encoded data 30, for example, for receipt at the decoder 50.

Alternatively, or additionally, the encoder 10 is operable to inspect whether or not there is a suitable element E available for the reconstructed data block, similarly as for the source block; in such a case, a different encoding quality threshold can be employed. If a certain element E is selected to represent the reconstructed data block, its reference value R can be stored or sent, for example in the encoded data 30. Alternatively, if a suitable database element E cannot be selected to represent the reconstructed data block, namely the reconstituted data block, then the reconstructed data block, or the given data block in the source data 20, has to be sent using an encoding algorithm which is most suitable for the reconstructed data block, namely the reconstituted data block. A method is chosen which generates less bits in the encoded data 30, creates less errors, or optimizes used bits for created error, for example by using some lambda coefficient corresponding to RD optimization. This encoded data block can then be added to one or more of the dynamic databases 120 for future use when encoding data at the encoder 10 and/or at the decoder 50.

Optionally, the encoder 10 employs encoding techniques as described in European patent EP 1787262 and in European patent application EP12173534.4 which are hereby incorporated by reference; when employing these techniques as described, for example for encoding video content, a colour that represents an unchanged data block can be found in a database 100, or unchanged blocks can be detected and coded differently. Only the changed data blocks require coding using, for example, known coding techniques, for example as provided in Table 2; in addition to Table 2, different kinds of coding methods are optionally employed, as Table 2 only describes entire coding solutions, but not individual methods such as inter- and extrapolation, multilevel, DCT and so forth. Similar functionality can be provided for both the encoder 10 and the decoder 50 for optimizing performance in this example based upon the European patent EP 1787262 and in European patent application EP12173534.4 which, as aforementioned, are hereby incorporated by reference. The contents of other related patent applications are also hereby incorporated by references, namely European patent application EP13172237.3, filed on 17 Jun. 2013.

For further elucidating embodiments of the present disclosure, the databases 100 and aforementioned reference values R will now be described in greater detail; for example, reference is made to published US Patent Publication No. 2010/322301 which is hereby incorporated by reference. As aforementioned, there are two types of database: static databases 110 and dynamic databases 120. The static databases 110 can be stored in any type of memory; for faster performance, the static databases 110 are optionally stored in ROM, for example ROM can be written or field programmed into a Silicon integrated circuit. Alternatively, or additionally, the static databases 110 are hard-coded into compiled software products recorded on non-transitory (non-transient) machine-readable data storage media. For example, in embodiments of the present disclosure, a static database 110 can be created from a dynamic database 120 as aforementioned, and then stored as a corresponding static database 110. The static databases 110 are each identified by unique reference code pertaining thereto. The dynamic databases 120 are optionally written into RAM, or any equivalent read-write data memory, for example magnetic or optical data storage media such as high-speed magnetic disc data storage.

Optionally, embodiments of the present disclosure employ "jumping". Jumping enables missing elements E in a database 100 to be sourced from elsewhere. Moreover, jumping can be employed for both static and dynamic databases 110, 120 respectively. Furthermore, jumping enables dynamic databases 120 to be rapidly updated in respect of missing elements. For such jumping to function efficiently, it is desirable that all data is decoded in a similar order, starting from a creation of a database to a current usage time.

The aforesaid reference values R uniquely identify corresponding elements E in a database 100, wherein the elements E represent different types of data blocks. However, it is desirable that the reference values R are generated using a method which is adapted to a type of data content present in the source data 20 which is to be encoded by the encoder 10. In other words, a reference value R is computed in the encoder for each corresponding data block present in portions of the source data 20 or corresponding coded data block. In the encoder 10, the encoded data block represented by its reference value R is reconstructed, namely encoded and then decoded back in the encoder 10, for ensuring that the decoder 50 will be able to generate the same database reference value R for the coded data block which is added to the one or more databases 100; a reason for such a manner of operation is that, when an encoding method has been selected for a given block in question, then, on the basis of parameters that it has produced, a block is reconstructed or decoded. This reconstructed block is then what the database element E and its reference value R are constructed from. The decoder 50 generates exactly the same one or more databases 100 as employed in the encoder 10 when encoding the source data 20. Various methods can be employed, when implementing embodiments of the present disclosure, to compute the reference values R, but is computed from an amplitude (or min and max), variance (or standard deviation), mean (or sum) and check-sum (or hash or index) values pertaining the data blocks present in the source data 20 to be encoded in the encoder 10. "Amplitude" refers, for example, to a difference between the biggest and smallest original data-, or pixel-, values within a given data block. The sum value for a (2D) data block is optionally computed by using the Equation 1 (Eq. 1):

$$SUM = \sum_{i=1}^{m} \sum_{j=1}^{n} block(i, j) \qquad \text{Eq. 1}$$

wherein:
SUM=sum value;
m×n=number of pixels or data values present in the (20) data block, for example n=8,
    m=8 for a 8×8 pixel data block; and
i, j=reference indices.
Mean value is computed by multiplying the sum value with 1/(m*n), namely dividing the sum value by the number of data values summed to generate the sum value.
Moreover, the variance of the (2D) data block can be computed using Equation 2 (Eq. 2):

$$V = \frac{1}{m*n}\left(\left(\sum_{i=1}^{m} \sum_{j=1}^{n} block[i,j]^2\right) - M^2\right) \qquad \text{Eq. 2}$$

wherein:
V=variance.
Standard deviation can be computed from a square root of the variance V.

The check-sum for the data block is computed using a logical XOR function against every value, namely pixel in a region of interest (ROI). For example, for static and dynamic databases 110, 120 respectively, the amplitude, the variance V, the mean M and the check-sum as provided in Table 4:

TABLE 4

Example amplitude, variance, mean and check-sum

| Parameter | Example value |
| --- | --- |
| Amplitude | AMPLITUDE_BITS = 4 |
| Variance | VARIANCE_BITS = 3 |
| Mean | MEAN_BITS = 8 |
| Check-sum | CHECKSUM_BITS = 5 |

For known elements E of a database reference value R, pseudo-code computation can, for example, be executed as follows:

DBREF=(AMPLITUDE SHL(DBREF_BITS−AMPLITUDE_BITS))+(VARIANCE SHL(DBREF_BITS−(AMPLITUDE_BITS+VARIANCE_BITS)))+(MEAN SHL(DBREF_BITS−(AMPLITUDE_BITS+VARIANCE_BITS+MEAN_BITS)))+CHECKSUM

It should be noted that the reference value R to be calculated is the combined transmitted reference value R for a static database 110, and that in the actual search for the element E, more precise and/or more inaccurate values can be used. The checksum has no effect for limiting the search, unless a perfect match is sought.

A maximum allocated number of bytes of a static or dynamic database 110, 120 respectively is defined by the database reference value R. In order to compute a total bit count for a given database reference value R, all elements E must be added where the reference value R is computed, wherein the elements E include the amplitude, the variance V, the mean M and the check-sum, namely MVA combination. For example, the bit count for a database reference value R can be computed as follows:

DBREF_BITS=AMPLITUDE_BITS+VARIANCE_BITS+MEAN_BITS+CHECKSUM_BITS

A database cannot contain more elements than the length of the element-dependent part of the transmitted reference R, namely the mean value has no effect on the length if the database does not use a mean value, for example zero-mean database, but otherwise it does.

For example, if the bits are set as in the example of Table 4, then for a normal database, the number of elements E will be according to 20 bits, and for a database that does not use a mean value, 12 bits, and then accordingly, the amounts will be approximately a million elements versus 4000 elements. Moreover, each element E, of course, requires bytes according to the presentation format of the data. For instance, for an 8×8 block with 8-bit values, a normal element, namely which has a mean value, 64 bytes per element are needed, whereas an element that has no mean value part requires 64*9/8=72 bytes per element E, because the sign bit needs to be stored for each data value. This yields the maximum size for an 8×8 database as presented in the example for a database that uses the mean value, 64 MB, and for the database that does not use the mean value, only 288 kB. These numbers thus represent the maximal allocation for the data values of the database elements alone, and the size thus depends on the bit counts for the various parts of the reference value (R), on the size of the block, and on the dynamics of the data values. In addition to this, for the purposes of performing a fast search, more precise and/or more inaccurate reference values (R) will need to be stored in the encoder 10. For the decoder 50, it is sufficient to have such database data which has been organized in such a way that the addresses of the right reference data are easily found.

As a further example, a total size of a given database 100 is computed to be 1,048,576 elements, namely a value $2^{20}$, namely approximately 1 Mega-elements. If each element E includes 64 pixels, namely is implemented as an 8×8 data block of pixels, that has 1 byte dynamic range per pixel, then the total size of the uncompressed given database 100 is 64 Mbytes.

Figure 3:
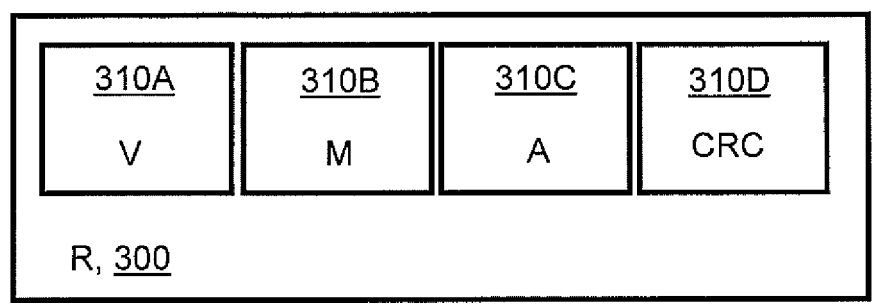
FIG. 3 is a schematic illustration of a multiple separately-defined portions of a reference value communicated within the codec of FIG. 1.

As illustrated in FIG. 3, a given reference value R is indicated by 300 and comprises several mutually different portions 310A, 310B, 310C, for example variance V, mean M, amplitude A respectively. These parts are computed separately, and thus a search in the encoder 10 and/or in the decoder 50 can be implemented as rapidly as possible, allowing thereby for fast encoding and/or decoding operations. The different portions 310 function as separate database sub-references, namely indexes, for example with an addition of a cyclic redundancy check (CRC) as denoted by 310D. Moreover, if a large database 100 is constructed that is based solely on the order of creation, or alternatively on the CRC, it is advantageous for the codec to generate a lookup table as well. This lookup table is employed to browse a suitable combination of mean M, variance V and amplitude A, in a fast manner.

When computing the reference values R 300, different sampling approaches can be employed, and the reference values R 300 include additional weighting coefficients, wherein the additional weighting coefficients enable searches amongst fewer alternatives, or the additional weighting coefficients enable the codec to find an element E, for example, for borders of images which are less important in respect of decoding quality in a comparison to a central portion of an image; this can be achieved, for example, by employing a dynamically varying quality threshold in the encoder 10 when encoding the source data 20. Searches in the codec 5 can thereby be executed faster because the reference value R includes more precise parameters of data to which they relate; moreover, the CRC or similar index makes it possible to have several database elements E for one basic combination.

Optionally, a search in the one or more databases 100 based upon a given reference value R is executed starting from a large database 100 which contains a reference regarding which elements E, and in which smaller databases 100, have the same or similar types of elements E. Alternatively, the small database 100 also maintains such information regarding MVA combinations in respect of data that the small database 100 retains; this information enables the smaller database 100 to be ignored rapidly by the encoder 10 and/or the decoder 50 if the combination in the given data block being searched is sufficiently different.

In respect of the aforesaid reference value R, 300, it is optionally advantageous to compress the variance V and the amplitude A together, for example to reduce a total number of bits required to define the reference value R, 300, and hence a reduction in a size of the encoded data 30 needing to be communicated from the encoder 10 to the decoder 50 in FIG. 1; such benefit derives from the variance V and the amplitude A being strongly correlated. Conversely, the mean M and CRC/index portions of the reference value R, 300 are compressed separately, because the mean M is often compatible with a relatively delta characteristic but CRC can be very random. For a combination of variance V and amplitude A portions that is quantized using fewer bits, it is advantageous to employ Run-Length Encoding (RLE) for generating the encoded data 30; alternatively, delta encoding can be employed for such purpose. If a first given variance V and amplitude A combination is quantized with relatively fewer bits, and a second given variance V and amplitude A combination encoded with more bits in the encoded data 30, it is advantageous that the combinations are encoded separately, for example RLE can be employed for the first given combination, and Huffman coding can be employed for the second given combination, but not limited thereto. Other types of encoding may be employed, for example:

Range, SRLE: "Split run-length encoding", a method disclosed in GB1303660.3 filed by Gurulogic Microsystems Oy on 1 Mar. 2013;

EM: "Entropy Modifier", a method disclosed in GB1303658.7 filed by Gurulogic Microsystems Oy on 1 Mar. 2013); and Odelta: a method disclosed in GB1303661.1 filed by Gurulogic Microsystems Oy on 1 Mar. 2013), but not limited thereto.

The reference values R 300 to be communicated via the encoded data 30 from the encoder 10 to the decoder 50 are compressed using various compression techniques, for example:

(i) VLC-based methods such as Huffman coding with database coding methods employing Lempel-Ziv algorithms, for example ZLIB, LZO, LZSS, LZ77; and (ii) Huffman coding or similar for aforesaid combinations of values, for example variance V and amplitude A.

Optionally, the reference values R, 300 can be compressed as entire values, or parts of the reference values R, 300, for example as illustrated in FIG. 3, can be compressed separately. Moreover, it is optionally feasible to employ a combination of data compression techniques to achieve even greater data compression in the encoded data 30; for example, the variance V portions of the reference values R, 300 can be firstly compressed using delta coding to generate first compressed data, and then RLE coding techniques can be applied to the first compressed data to generate second compressed data, and then Huffman coding can be applied to the second compressed data to generate third compressed data, wherein the third compressed data is, for example, communicated in the encoded data 30 from the encoder 10 to the decoder 50.

One or more of the databases 100 can contain elements E that consist of the data values of the data blocks in a previously known order, for example in a progressively graded manner. If the order differs from a default order assumed for the codec 5 of FIG. 1, such a differing order is defined in the encoded data 30 by an order-configuring parameter. For example, such a sort of data-valued database element E can be created from any right-sized data block, for example from a reconstructed image. Optionally, the parameter can be toggle between states in a course of the encoded data 30 being communicated from the encoder 10 to the decoder 50.

Optionally, the one or more dynamic databases 120 that are updated according to a previously known order employ a flexible number of elements E per frame, for example for enabling the codec 5 of FIG. 1 to achieve a greater data compression ratio for images with relatively less information content. For example, if sizes of a given dynamic database 120 for different frames are 126, 193, 252, 303 elements, then the number of bits required for uniquely addressing each element for each frame are 7, 8, 8 and 9 bits respectively. In a large database 100, the elements E can be arranged in a ("set number", "get number") type of structure, with regard to element E addressing; for example, in a byte of 8-bits, one bit of the byte is reserved for notifying a recipient if the whole value has been transmitted, and the remaining seven bits are used to define the value being sent, optionally with more bits thereafter. By such an approach, it is feasible to transmit seven-bits-worth of information with one byte and fourteen-bits-worth of information in two bytes. Avoiding a need to include bits of information in the encoded data 30 is capable of providing enhanced data compression in the codec 5 of FIG. 1.

Optionally, elements E included within the one or more databases 100 can be combined, for example to occupy less data memory, or they can contain a sum or coefficient elements, for example for a scaling database 100 or a database 100 with zero mean, which can be computationally adapted using one or more parameters to provide elements E in an appropriate manner when encoding the source data 20 and/or when decoding the encoded data 30.

Optionally, it is feasible to use any one or more parameters, or such one or more parameters which have been deleted from the block itself before it is inserted into the database 100. Correspondingly, when a database element E is used, the data produced by these parameters needs to be added to the element E when the resulting block is constructed. In a first implementation, an average colour parameter is employed. Sliding colour parameters and other parameters can also be used. In principle, with this database element E that is in the memory, a prediction or any other coding method can be used. This average is very useful, because it is possible to use an average as part of the reference R in other ways as well, and therefore no new data needs to be transmitted to utilize it, and therefore it is feasible to reduce considerably a size of the actual database 100 that is stored in the memory. Of course, by adding bits to other references R, it is feasible to increase the size of the database 100 stored in memory, and thus gain a lot of new elements E as well that can be used in coding. When the average is deleted from the block, then the element becomes approximately zero mean.

An example is given below, wherein an omission of the mean value from the block values is employed, thereby providing a more efficient usage of the database in connection with different average values. The aforesaid method of encoding is applied for sliding blocks, for predictions or for blocks coded in some other fashion. A result thus gained can then be deleted from the database prior to the construction of the database elements E, and correspondingly, appended to a database element E that has been fetched from the database, in connection with decoding, upon reconstruction of the data block.

The mean value is therefore a simplest coding method, and also in that respect, as it actually clearly removes a need for one element/or part in the reference value R when the reference value R is constructed from the multiple parts thereby decreasing a size of the database. The amplitude could also be used to relativize the data values, and it would thereby provide benefits for the coverage of the database without decreasing the size of the database.

The other predictions or coding methods actually only produce prediction error blocks, and their use is not as practical. Of course, the mean values can be omitted from them as well, thereby providing a prediction error type database, with the corresponding properties as the database for the original blocks. Of course, it will be appreciated that database elements E can be used as prediction error data for another database block, and thus recursion of database elements E is also supported pursuant to the present disclosure.

However, it is not advantageous to execute a large number of recursions, unless the databases are very small or unless a really precise reconstruction is desired, because, otherwise, the encoded data size of the data block will rapidly grow very large.

Moreover, the one or more databases 100 can include elements E which have been computed, for example using extrapolation techniques; in other words, the codec 5 has knowledge of a computation method which has been used to generate a given data block and a total size of the given data block, together with one or more values to provide a basis on which the data values of the data block can be computed. Such computation is implemented using a DC method and a slide method. The DC method utilizes one value, for example an offset value, that is then applied to all data values within a given data block. Conversely, the slide method, for example implemented as a one-dimensional slide method utilizes two values, for example a first data value and a last data value with the given block, and then computes remaining values for the data block by way of linear interpolation based upon the first and last data values in a linear manner, alternatively in a polynomial manner. Moreover, a two-dimensional slide method is optionally employed which utilizes four values corresponding to corner points in a data block, wherein a remainder of points in the data block are computed using bi-linear interpolation. Furthermore, other types of computational algorithms are optionally employed for computing values for data blocks from relatively few initial values within the codec 5 of FIG. 1.

One or more of the databases 100 optionally include elements E that are references to other databases, for example in a hierarchical manner. In such a case, the element E includes information defining another database 100 and also a reference value R for an element E within that other database 100. On a basis of such information, the data values for a given desired data block can be computed. Such a manner of accessing one or more elements E from a secondary database invoked from an element E of a first database utilizes one or more scaling coefficients and/or one or more pixel value offset shifts, for example if the database element E being referred to in the secondary database is of a different size, for example data block size, relative to a desired data block to be returned by invoking the element E of the first database. Such an approach employs an Affine model as described in a publication Wikipedia as accessed 19 Oct. 2012 via URL: http://en.wikipedia.orq/wiki/Affine transformation. In Table 5, there is provided an overview of database element types employed for implementing the codec 5 of FIG. 1.

TABLE 5

| database element types | | |
| --- | --- | --- |
| Type | Sub-type | Detailed explanation |
| Data-valued elements | | These consist of the data values of a data block |
| Computed elements | DC method Slide method | These require knowledge of method used and certain key values for use in the method |
| References to other databases | These optionally include scaling coefficients and/ or pixel shifts or transformations | These require knowledge of the method used, together with reference values in secondary databases |
| Combined elements | These optionally include a sum or coefficient elements, for example a scaling database or a database with zero mean value. | These can be employed with one or more additional parameters. |

Embodiments of the present disclosure have potentially widespread application in electronics products that are operable to send and/or receive data representative of various types of content, for example streamed video content, Internet TV, content conveyed via physical data carriers such as optically-readable disks and so forth. Moreover, when the databases 100 are made available only to specific parties, such that, for example, substantially mostly, reference values R are communicated in the encoded data 30, the present disclosure can provide data encryption services; the idea/ objective here is that, with help of the references from the database, it is feasible to send at least a majority of the encoded data, and only the small part would require coding of the block values with some other coding methods. Thus, the embodiments are applicable in many diverse technical industries. Moreover, the embodiments are capable of reducing communication network load or requirements, reducing data storage capacity requirements, as well as potentially enabling high quality data encoding and decoding to be achieved; these may be beneficial technical effects.

The encoder 10 and the decoder 50 are implemented as one or more hardware data processors. Optionally, the hardware data processors are implemented in a hard-wired manner, for example by employing ASIC's or similar digital circuits. Optionally, the hardware data processors are implemented using computing hardware, wherein the computing hardware is operable to execute one or more software products recorded on non-transitory (non-transient) machine-readable data storage media.

The aforementioned one or more databases 100 are optionally implemented in the encoder 10, in the decoder 50, in a LAN, provided by a ISP, implemented in separate memory such as a hard disk memory, in memory cards, on Blu-ray discs, in RAM, in ROM, in Flash data memory, on SSD, on DVD, on CD and any other type of data carrier providing access to its data. "Blu-ray" is a registered trademark.

The one or more databases 100, when provided by one or more data servers, for example implemented as one or more memory cards, wherever the one or more data servers are spatially located, can be connected to encoder 10 and/or the decoder 50 in a one or more ways as follows: via fixed connections, via contact points, via cables, via wireless links, via wireless networks (for example, such as Bluetooth and WLAN), via cellular networks (for example, such as GSM, 3G, 4G, 5G, LTE), via satellite connection, but not limited thereto. "Bluetooth" is a registered trademark.

Optionally, in the foregoing, the elements E can be inserted into the database 100, out of the decoded data blocks, one at a time, combined or used only partly. That is, in principle, any decoded set of data values can construct a new element E in the database according to given or agreed principles, and any coding method or coding solution can be used to produce decoded data, out of which elements are inserted into the database.

Optionally, the encoder 10 and the decoder 50 are included as sub-components of a multilevel encoder and a corresponding multilevel decoder, pursuant to the method disclosed in the GB1218942.9 and equivalent U.S. patent application Ser. No. 13/657,382 as well as corresponding applications EP13003859.9 and U.S. Ser. No. 14/058,793. In the multilevel encoder, the source data 20 is analysed and partitioned into a plurality of streams of data, for example depending upon a nature of content present in the source data 20. One of the plurality of streams of data is provided to the encoder 10 which generates corresponding encoded data; the corresponding encoded data is combined with other encoded output data from other encoders processing the other data streams of the plurality of data streams to generate final encoded data provided from the multilevel encoder. At the multilevel decoder, the final encoded data is received and thereafter split into a plurality of data streams, wherein one of the data streams is provided to the decoder 50 to generate corresponding decoded data; the corresponding decoded data is combined with decoded data provided from other decoders of the multilevel decoder to generate final decoded output data. Although such multilevel encoders and decoders are more complex than merely the encoder 10 and the decoder 50, such multilevel encoders and decoders are capable of providing exceptional encoding, decoding and a data compression performance when handling a wide spectrum of types of data.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

What is claimed is:

1. A method of encoding source data to generate corresponding encoded data for transmission or storage, wherein the source data includes at least one of: audio data, image data, video data, graphics data, multi-dimensional data, and measurement data, the method comprising:
  matching one or more portions of the source data to one or more elements in one or more databases, using reference values to determine matches, wherein the one or more elements are representative of corresponding one or more data blocks, and recording a plurality of selected databases and the reference values which relate the one or more portions of the source data to the one or more matched elements, wherein the plurality of selected databases simultaneously include one or more static databases and one or more dynamic databases used in encoding the source data;
  including the reference values in the encoded data together with the plurality of selected databases and/or information identifying the plurality of selected databases as well as a selection of one or more encoding methods employed to generate the encoded data;
  dividing at least a part of the source data into one or more areas having a unique area identifier, wherein the one or more areas contain the one or more portions of the source data depending on the part of the source data divided;
  taking area-specific samples of the source data from the areas using one or more sampling approaches and computing corresponding reference values on a basis of the area-specific samples;
  checking whether or not the one or more areas of the source data corresponding to the reference values obtained from computations applied to the source data have already been stored in the one or more databases or transmitted; and
  transmitting the reference values, or the reference values in a compressed state, for uniquely identifying database elements into the encoded data when the one or more areas of the source data have already been stored in the one or more databases, or
  transmitting the encoded and/or unencoded source data into the encoded data when the one or more areas of the source data have not been previously stored in the one or more databases.

2. The method as claimed in claim 1, wherein the method includes employing one or more zero-mean databases for implementing the one or more databases.

3. The method as claimed in claim 1, wherein the method includes at least one of:
  generating one or more static databases by selecting elements from one or more dynamic databases;
  processing information present in the one or more portions of the source data to generate one or more elements for inclusion in the one or more dynamic databases; and
  selecting elements from one or more earlier databases and including them in the one or more dynamic databases for use with the encoded data.

4. The method as claimed in claim 1, wherein the one or more databases are hosted in one or more data servers.

5. The method as claimed in claim 4, wherein the method includes remotely controlling the one or more data servers.

6. The method as claimed in claim 4, wherein the method includes sharing the one or more databases between at least one encoder operable to generate the encoded data and at least one decoder intended for receiving the encoded data.

7. The method as claimed in claim 1, wherein the method is implemented in an encoder which is coupled via a communication network to the one or more databases, wherein at least one of the one or more databases is in a mutually similar local area network of the communication network to that of the encoder.

8. The method as claimed in claim 1, wherein the reference values include multiple parts which are separately encoded for inclusion in the encoded data.

9. The method as claimed in claim 1, wherein elements of the one or more dynamic databases are generated when matches of the one or more portions of the source data with one or more elements in the one or more static databases are not found.

10. The method as claimed in claim 1, wherein matching of the one or more portions of the source data with one or more elements of the one or more databases is made within a quality threshold, wherein the quality threshold is dynamically altered during generation of the reference values.

11. The method as claimed in claim 1, wherein the one or more reference values are used to reconstruct one or more corresponding portions of the source data using one or more elements defined by the one or more reference values, and wherein errors are determined between the reconstructed one or more portions and corresponding original one or more portions in the source data, and the errors are encoded and included in the encoded data.

12. The method as claimed in claim 1, wherein one or more elements of a first database are operable to refer to one or more elements present in one or more other of the one or more databases.

13. The method as claimed in claim 1, wherein the one or more databases are selected and/or are varied in size depending upon a nature of content present in the source data.

14. An encoder for encoding source data to generate corresponding encoded data, wherein the source data includes at least one of: audio data, image data, video data, graphics data, multi-dimensional data, and measurement data, wherein the encoder comprises:
  first data processing hardware for matching one or more portions of the source data to one or more elements in one or more databases, using reference values to determine matches, wherein the one or more elements are representative of corresponding one or more data blocks, and recording a plurality of selected databases and the reference values which relate the one or more portions of the source data to the one or more matched elements; and
  second data processing hardware for including the reference values in the encoded data together with the plurality of selected databases and/or information identifying the plurality of selected databases as well as a selection of one or more encoding methods employed to generate the encoded data, wherein the plurality of selected databases simultaneously include one or more static databases and one or more dynamic databases used in encoding the source data;
wherein the encoder is operable:
  to receive the source data in the form of one or more data blocks, divide at least a part of the source data into areas having a unique area identifier, wherein the one or more areas contain the one or more portions of the source data depending on the part of the source data divided;
  to take area-specific samples of the source data from the areas using one or more sampling approaches and compute corresponding reference values on a basis of the area-specific samples;
  to check whether or not the one or more areas of the source data corresponding to the reference values obtained from computations applied to the source data have already been stored in the one or more databases or transmitted, and to transmit the reference values, or the reference values in a compressed state, for uniquely identifying database elements into the encoded data when the one or more areas of the source data have already been stored in the one or more databases, or to transmit the encoded and/or unencoded source data into the encoded data when the one or more areas of the source data have not been previously stored in the one or more databases.

15. A method of decoding encoded data to generate corresponding decoded output data, wherein the method of decoding includes:

receiving the encoded data including reference values and information regarding area identifiers and information regarding a plurality of selected databases, and a selection of one or more encoding methods used, wherein the encoded data is encoded by one or more encoding techniques, wherein the plurality of selected databases simultaneously include one or more static databases and one or more dynamic databases used in encoding the source data;

decoding from the encoded data the reference values;

accessing one or more elements from the plurality of selected databases as directed by the reference values, wherein the one or more elements are representative of one or more corresponding data blocks; and assembling the one or more corresponding data blocks of the one or more elements accessed to provide data for use in generating the decoded output data.

16. The method as claimed in claim 15, wherein the method includes:

maintaining data in a database, wherein the data includes at least one of audio data, image data, video data, graphics data, multidimensional data, measurement data corresponding to the reference values;

generating area identifiers based on information regarding area identifiers included in the encoded data;

receiving or retrieving from the encoded data a reference value corresponding to one or more area identifiers;

retrieving from the database on the basis of the reference value for a corresponding area identifier data corresponding to the reference value; and generating, on the basis of the data retrieved from the database, a data block that is assembled to total decoded output data based on the area identifier.

17. The method as claimed in claim 15, wherein the method is executed in a decoder which is coupled via a communication network to the one or more databases.

18. The method as claimed in claim 15, wherein the one or more databases are spatially disposed locally to data processing hardware arranged to execute the method of decoding.

19. The method as claimed in claim 18, wherein the one or more databases are hosted in a local area network which also includes the data processing hardware, wherein the data processing hardware is coupled to the one or more databases in a mutually similar local area network of the communication network to that of the data processing hardware.

20. The method as claimed in claim 15, wherein the one or more databases are provided by one or more data servers.

21. The method as claimed in claim 20, wherein the one or more data servers are remotely controlled.

22. The method as claimed in claim 20, wherein the one or more databases are shared between at least one encoder operable to generate the encoded data and at least one decoder including the data processing hardware intended for receiving the encoded data.

23. The method as claimed in claim 15, wherein the method includes generating one or more dynamic databases from one or more elements of the one or more static databases and/or from information provided in the encoded data, wherein the generated one or more dynamic databases are employed for decoding the encoded data.

24. A decoder for decoding encoded data to generate corresponding decoded data, wherein the decoder includes:

first data processing hardware for receiving the encoded data including reference values and information regarding area identifiers and information regarding a plurality of selected databases and a selection of one or more encoding methods used, wherein the encoded data is encoded by one or more encoding techniques, wherein the plurality of selected databases simultaneously include one or more static databases and one or more dynamic databases used in encoding the source data;

second data processing hardware for decoding from the encoded data the reference values;

third data processing hardware for accessing one or more elements from the plurality selected databases as directed by the reference values, wherein the one or more elements are representative of one or more corresponding data blocks; and fourth data processing hardware for assembling the one or more corresponding data blocks of the one or more elements accessed to provide data for use in generating decoded output data.

25. A codec including at least one encoder for encoding source data to generate corresponding encoded data, the encoder comprising:

first data processing hardware for matching one or more portions of the source data to one or more elements in one or more databases, using reference values to determine matches, wherein the one or more elements are representative of corresponding one or more data blocks, and recording a plurality of selected databases and the reference values which relate the one or more portions of the source data to the one or more matched elements, wherein the plurality of selected databases simultaneously include one or more static databases and one or more dynamic databases used in encoding the source data; and second data processing hardware for including the reference values in the encoded data together with the plurality of selected databases and/or information identifying the plurality of selected databases as well as a selection of one or more encoding methods employed to generate the encoded data;

wherein the encoder is operable:

to receive the source data in the form of one or more data blocks, divide at least a part of the source data into areas having a unique area identifier, wherein the one or more areas contain the one or more portions of the source data depending on the part of the source data divided;

to take area-specific samples of the source data from the areas using one or more sampling approaches and compute corresponding reference values on a basis of the area-specific samples;

to check whether or not the one or more areas of the source data corresponding to the reference values obtained from computations applied to the source data have already been stored in the one or more databases or transmitted, and to transmit the reference values, or the reference values in a compressed state, for uniquely identifying database elements into the encoded data when the one or more areas of the source data have already been stored in the one or more databases, or to transmit the encoded and/or unencoded source data into the encoded data when the one or more areas of the source data have not been previously stored in the one or more databases, and at least one decoder receiving the encoded data and for decoding the encoded data to generate corresponding decoded data, the decoder comprising:

third data processing hardware for receiving encoded data including reference values and information regarding area identifiers and information regarding plurality of selected databases as well as a selection of one or more encoding methods used;

fourth data processing hardware for decoding from the encoded data the reference values;

fifth data processing hardware for accessing one or more elements from the plurality of selected databases as directed by the reference values, wherein the one or more elements are representative of one or more corresponding data blocks; and sixth data processing hardware for assembling the one or more corresponding data blocks of the one or more elements accessed to provide data for use in generating decoded output data.

26. A software product recorded on non-transitory machine-readable data storage media, wherein the software product is executable on computing hardware of an encoder for implementing the method comprising:

matching one or more portions of the source data to one or more elements in one or more databases, using reference values to determine matches, wherein the one or more elements are representative of corresponding one or more data blocks, and recording a plurality of selected databases and the reference values which relate the one or more portions of the source data to the one or more matched elements, wherein the plurality of selected databases simultaneously include one or more static databases and one or more dynamic databases used in encoding the source data; and including the reference values in the encoded data together with the plurality of selected databases and/or information identifying the plurality of selected databases as well as a selection of one or more encoding methods employed to generate the encoded data;

dividing at least a part of the source data into one or more areas having a unique area identifier, wherein the one or more areas contain the one or more portions of the source data depending on the part of the source data divided;

taking area-specific samples of the source data from the areas using one or more sampling approaches and computing corresponding reference values on a basis of the area-specific samples;

checking whether or not the one or more areas of the source data corresponding to the reference values obtained from computations applied to the source data have already been stored in the one or more databases or transmitted, and transmitting the reference values, or the reference values in a compressed state, for uniquely identifying database elements into the encoded data when the one or more areas of the source data have already been stored in the one or more databases, or transmitting the encoded and/or unencoded source data into the encoded data when the one or more areas of the source data have not been previously stored in the one or more databases.

27. A software product recorded on non-transitory machine-readable data storage media, wherein the software product is executable on computing hardware of a decoder for implementing the method comprising:

receiving encoded data including reference values and information regarding area identifiers and information regarding a plurality of selected databases and a selection of one or more encoding methods used, wherein the encoded data is encoded by one or more encoding techniques, wherein the plurality of selected databases simultaneously include one or more static databases and one or more dynamic databases used in encoding the source data;

decoding from the encoded data the reference values;

accessing one or more elements from the plurality of selected databases as directed by the reference values, wherein the one or more elements are representative of one or more corresponding data blocks; and assembling the one or more corresponding data blocks of the one or more elements accessed to provide data for use in generating decoded output data.

28. The method as claimed in claim 1, further comprising storing the encoded and/or unencoded source data as a new database element into the one or more databases in an event that the one or more areas of the source data corresponding to reference values have not previously been stored into the one or more databases.

29. The encoder as claimed in claim 14, wherein the encoded and/or unencoded source data is stored as a new database element into the one or more databases in an event that the one or more areas of the source data corresponding to reference values have not previously been stored into the one or more databases.

30. The codec as claimed in claim 25, wherein the encoded and/or unencoded source data is stored as a new database element into the one or more databases in an event that the one or more areas of the source data corresponding to reference values have not previously been stored into the one or more databases.

31. The software product as claimed in claim 26, wherein the method further comprises storing the encoded and/or unencoded source data as a new database element into the one or more databases in an event that the one or more areas of the source data corresponding to reference values have not previously been stored into the one or more databases.

* * * * *